US008107771B2

(12) United States Patent
Sako et al.

(10) Patent No.: US 8,107,771 B2
(45) Date of Patent: Jan. 31, 2012

(54) IMAGE PROCESSING APPARATUS AND IMAGE PROCESSING METHOD

(75) Inventors: Yoichiro Sako, Tokyo (JP); Masamichi Asukai, Kanagawa (JP); Itaru Kawakami, Kanagawa (JP); Masaaki Tsuruta, Tokyo (JP); Nozomu Ozaki, Kanagawa (JP); Hirotaka Sakaguchi, Tokyo (JP); Taiji Ito, Kanagawa (JP); Akinobu Sugino, Kanagawa (JP); Hidehiko Sekizawa, Tokyo (JP); Akane Sano, Tokyo (JP); Yoshiteru Kamatani, Kanagawa (JP); Kouichi Matsuda, Tokyo (JP)

(73) Assignee: Sony Corporation, Tokyo (JP)

( * ) Notice: Subject to any disclaimer, the term of this patent is extended or adjusted under 35 U.S.C. 154(b) by 988 days.

(21) Appl. No.: 12/077,245

(22) Filed: Mar. 18, 2008

(65) Prior Publication Data
US 2009/0016645 A1 Jan. 15, 2009

(30) Foreign Application Priority Data

Mar. 19, 2007 (JP) ................................. 2007-070442

(51) Int. Cl.
G06K 9/32 (2006.01)
G06K 9/20 (2006.01)
H04N 5/225 (2006.01)
(52) U.S. Cl. ..................... 382/298; 382/312; 348/207.99
(58) Field of Classification Search .................. 382/118, 382/173, 254, 276, 291, 298, 305, 312; 348/207.99, 348/349; 358/1.2, 528
See application file for complete search history.

(56) References Cited

U.S. PATENT DOCUMENTS

| 4,901,096 | A |   | 2/1990  | Lemelson |
|-----------|---|---|---------|----------|
| 5,463,443 | A |   | 10/1995 | Tanaka et al. |
| 5,835,641 | A | * | 11/1998 | Sotoda et al. ................. 382/291 |
| 5,887,086 | A | * | 3/1999  | Tokano ......................... 382/312 |
| 5,905,848 | A |   | 5/1999  | Yano et al. |
| 5,923,908 | A |   | 7/1999  | Schrock et al. |
| 6,677,969 | B1|   | 1/2004  | Hongo |

(Continued)

FOREIGN PATENT DOCUMENTS

CN 1812501 A 8/2006

(Continued)

OTHER PUBLICATIONS

Newton, "Philosophiae Naturalis Principia Mathematica" 1687, p. 12-13, vol. 1, Royal Society, London.

(Continued)

*Primary Examiner* — Kanjibhai Patel
(74) *Attorney, Agent, or Firm* — Wolf, Greenfield & Sacks, P.C.

(57) ABSTRACT

Disclosed herein is an image-processing apparatus. The apparatus includes: a taken-image acquisition section configured to acquire a taken image; and a to-be-processed area setting section configured to carry out an analysis on a taken image acquired by the taken-image acquisition section and configured to use the pixel area of a photographed-subject image of a specific type in the taken image as a to-be-processed area of an image conversion process in accordance with the size of the photographed-subject image if a result of the analysis indicates that the photographed-subject image exists in the taken image. The apparatus further includes an image conversion section configured to carry out the image conversion process on the photographed-subject image with the pixel area thereof used as the to-be-processed area in order to generate a post-conversion image obtained as a result of the image conversion process.

19 Claims, 17 Drawing Sheets

U.S. PATENT DOCUMENTS

| | | | |
|---|---|---|---|
| 6,714,680 B1 * | 3/2004 | Sasada | 382/216 |
| 7,035,440 B2 | 4/2006 | Kaku | |
| 7,206,461 B2 * | 4/2007 | Steinberg et al. | 382/274 |
| 7,403,641 B2 * | 7/2008 | Nakamoto et al. | 382/118 |
| 7,596,307 B2 | 9/2009 | Tomita et al. | |
| 7,664,912 B2 * | 2/2010 | Ito et al. | 711/112 |
| 7,689,011 B2 * | 3/2010 | Luo et al. | 382/118 |
| 7,711,253 B2 | 5/2010 | Tomita et al. | |
| 7,733,412 B2 * | 6/2010 | Takayama | 348/349 |
| 7,796,840 B2 * | 9/2010 | Mori et al. | 382/298 |
| 2001/0010544 A1 | 8/2001 | Wakui | |
| 2004/0130628 A1 | 7/2004 | Stavely | |
| 2005/0046730 A1 | 3/2005 | Li | |
| 2006/0165396 A1 | 7/2006 | Yamazaki | |
| 2006/0171707 A1 | 8/2006 | Higuma | |
| 2006/0228029 A1 | 10/2006 | Zhang et al. | |
| 2006/0257026 A1 | 11/2006 | Shiffer et al. | |
| 2007/0014543 A1 | 1/2007 | Nakase et al. | |
| 2007/0076960 A1 | 4/2007 | Takamori et al. | |
| 2008/0231714 A1 | 9/2008 | Estevez et al. | |
| 2008/0239092 A1 | 10/2008 | Sugino et al. | |
| 2008/0273798 A1 | 11/2008 | Asukai et al. | |
| 2008/0316339 A1 | 12/2008 | Sugino et al. | |
| 2010/0066840 A1 | 3/2010 | Asukai et al. | |

FOREIGN PATENT DOCUMENTS

| | | |
|---|---|---|
| JP | 63-053531 A | 3/1988 |
| JP | 03-092830 A | 4/1991 |
| JP | 05-142616 A | 6/1993 |
| JP | 06-030374 A | 2/1994 |
| JP | 07-043803 A | 2/1995 |
| JP | 07-218970 A | 8/1995 |
| JP | 08-110540 A | 4/1996 |
| JP | 10-048681 A | 2/1998 |
| JP | 11-174520 A | 7/1999 |
| JP | 11-205761 A | 7/1999 |
| JP | 2000-132693 A | 5/2000 |
| JP | 2001-197296 A | 7/2001 |
| JP | 2002-023716 A | 1/2002 |
| JP | 2002-049912 A | 2/2002 |
| JP | 2003-110999 | 4/2003 |
| JP | 2004-062560 | 2/2004 |
| JP | 2004-120404 A | 4/2004 |
| JP | 2004-134950 A | 4/2004 |
| JP | 2004-242360 A | 8/2004 |
| JP | 2005-110004 | 4/2005 |
| JP | 2005-182526 A | 7/2005 |
| JP | 2005-303511 | 10/2005 |
| JP | 3740351 | 11/2005 |
| JP | 2005-352239 A | 12/2005 |
| JP | 2006-050163 A | 2/2006 |
| JP | 2006-197373 A | 7/2006 |
| JP | 2006-201531 A | 8/2006 |
| JP | 2006-202049 A | 8/2006 |
| JP | 2006-202181 A | 8/2006 |
| JP | 2006-203600 A | 8/2006 |
| JP | 2006-221378 A | 8/2006 |
| JP | 2006-279291 A | 10/2006 |
| JP | 2006-319610 A | 11/2006 |
| JP | 2006-330800 A | 12/2006 |
| JP | 2006-331271 A | 12/2006 |
| JP | 2007-166542 A | 6/2007 |
| JP | 2007-249527 A | 9/2007 |

OTHER PUBLICATIONS

Hirasawa et al., "Development of Face Image Capturing System for Best Appearance—The Improvement of the Face Detection Algorithm", Institute of Electronics, Information and Communication Engineers Technical Study Reports, Japan, Corporate Judicial Person Institute of Electronics, Information and Communication Engineers, Nov. 11, 2004, vol. 104, No. 449, p. 61-66.

* cited by examiner

FIG.3

| | IMAGE MANAGEMENT INFORMATION | TAKEN IMAGE | POST-CONVERSION IMAGE |
|---|---|---|---|
| #1 | C1 | VD1 | cVD1 |
| #2 | C2 | VD2 | cVD2 |
| #3 | C3 | VD3 | cVD3 |
| #4 | C4 | VD4 | cVD4 |
| #5 | C5 | VD5 | cVD5 |
| | ⋮ | ⋮ | ⋮ |
| #n | Cn | VDn | cVDn |

FIG. 5A  TAKEN IMAGE
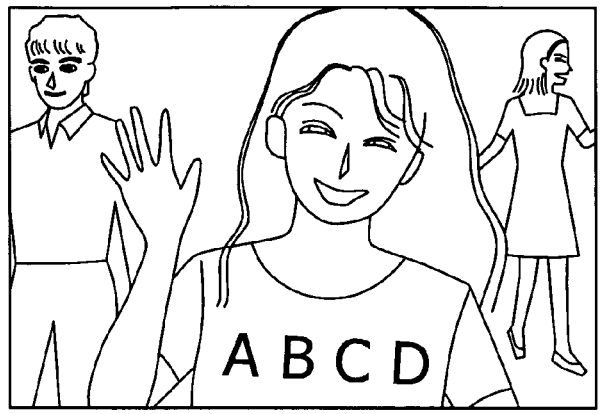
FIG. 5B  DETERMINATION OF TO-BE-PROCESSED AREAS
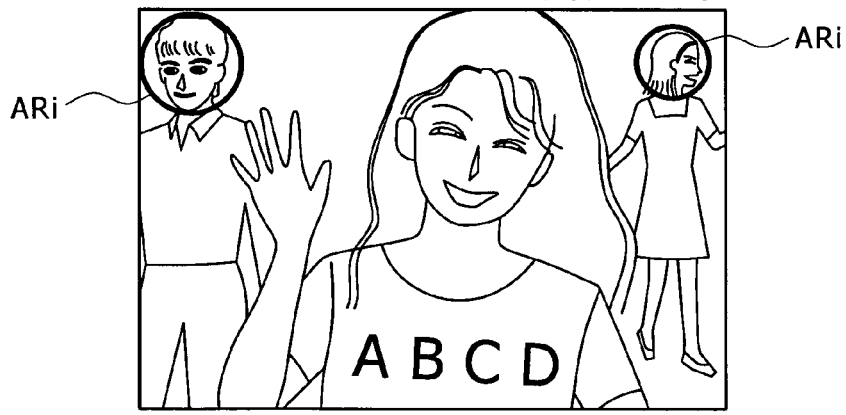
FIG. 5C  POST-CONVERSION IMAGE
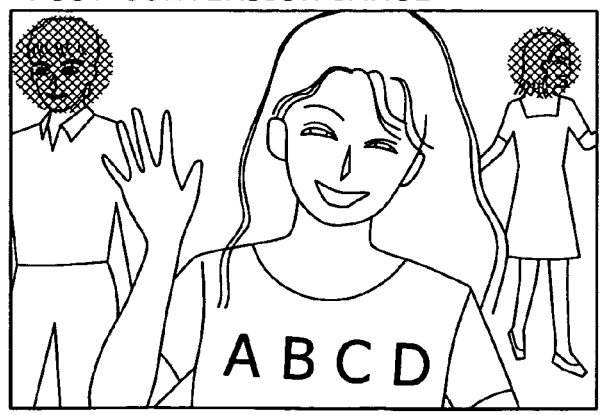

FIG.6A TAKEN IMAGE
FIG.6B DETERMINATION OF TO-BE-PROCESSED AREAS
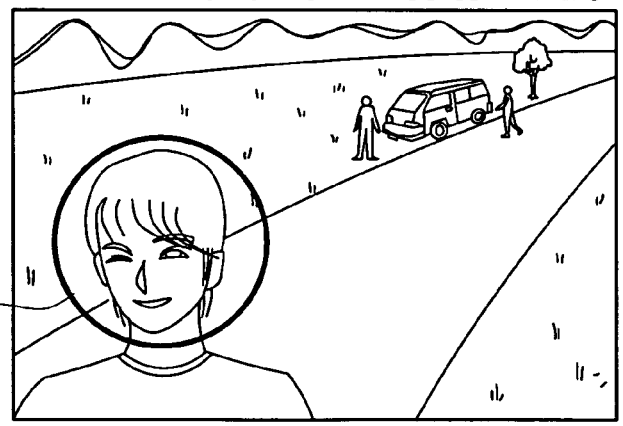
ARi
FIG.6C POST-CONVERSION IMAGE
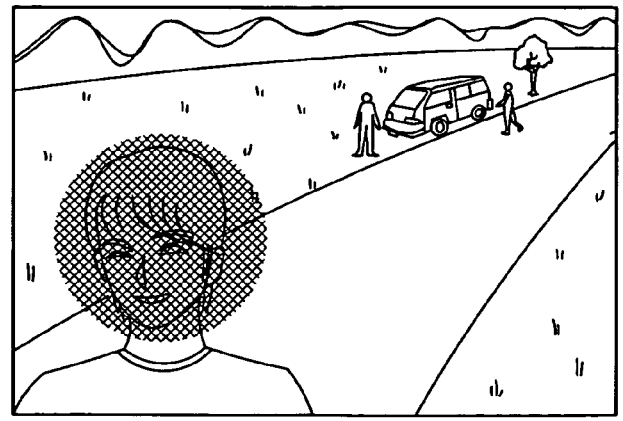

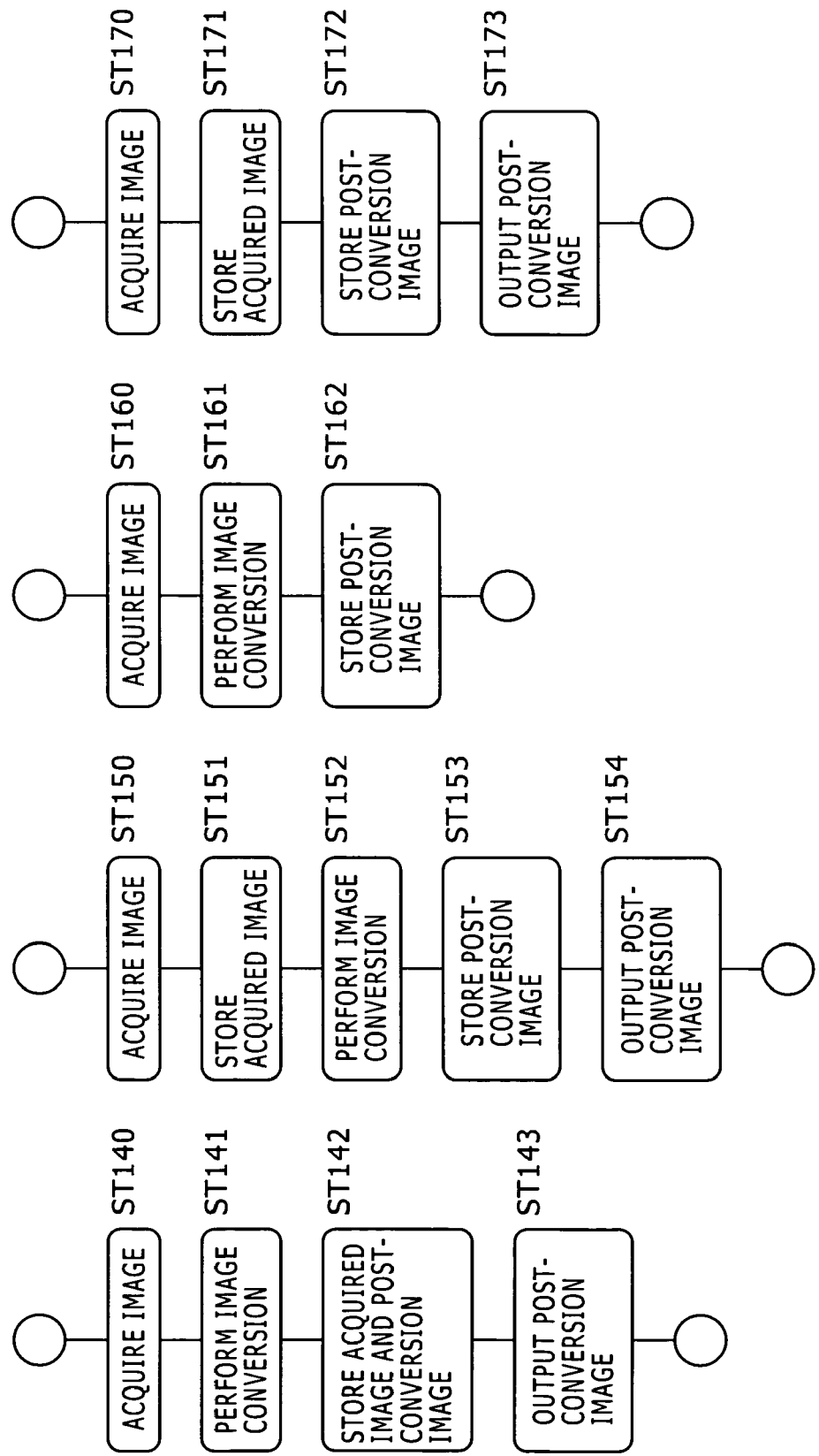

IMAGE PROCESSING APPARATUS AND IMAGE PROCESSING METHOD

CROSS REFERENCES TO RELATED APPLICATIONS

The present invention contains subject matter related Japanese Patent Application JP 2007-070442 filed in the Japan Patent Office on Mar. 19, 2007, the entire contents of which being incorporated herein by reference.

BACKGROUND OF THE INVENTION

1. Field of the Invention

The present invention relates to an image-processing apparatus for carrying out image processing on the taken image and an image processing method adopted by the image-processing apparatus.

2. Description of the Related Art

Arts related to the invention are described in patent documents listed as follows:
Patent document 1:
Japanese Patent Laid-open No. 2003-110999
Patent document 2:
Japanese Patent Laid-open No. 2005-303511
Patent document 3:
Japanese Patent Laid-open No. 2004-62560
Patent document 4:
Japanese Patent No. 3740351

With the popularization of networks such as the Internet and the improvement of performances displayed by a variety of apparatus utilized by general users, the image data taken by an individual in a photographing can be displayed on a home page or the like, shared by other users through the networks and exchanged with the other users with ease. The apparatus utilized by general users include a personal computer, a hand phone and an image pickup apparatus. An image taken by an individual in a photographing can be a moving or standstill image. For example, patent documents 1 and 2 listed above disclose a technology related to a system for sharing an image (or a photograph) and a technology related to a service for sharing an image (or a photograph).

As such a system is put to practical use and the number of images shared through the system increases, it is anticipated that the number of image-right and the number of copyright problems are raised. For example, there will be a situation in which a photographed image as an image of the face of a certain person or an image of a copyrighted work is disclosed in a network without prior consent regardless of whether the image is disclosed with an ill or bona fide intention.

On the other hand, patent documents 3, 4 and 5 propose a technology for avoiding the image-right and copyright problems by carrying out mosaic generating processing or the like on a portion of an image of the face of a person.

SUMMARY OF THE INVENTION

In the described present state of the art, however, there has not been proposed a technology for preventing the user from carrying out unnecessary mosaic generating processing on an image taken in a photographing or a technology for avoiding a situation in which the user inadvertently infringes an image right or a copyright because the user conversely does not carry out mosaic generating processing on a taken image.

Inventors of the present invention have innovated an image-processing apparatus intended to carry out proper image processing, of which the user is not aware in particular, on an image taken in a photographing and innovated an image processing method to be adopted by the image-processing apparatus.

In accordance with an embodiment of the present invention, there is provided an image-processing apparatus employing:

a taken-image acquisition section configured to acquire a taken image;

a to-be-processed area setting section configured to carry out an analysis on a taken image acquired by the taken-image acquisition section and configured to use the pixel area of a photographed-subject image of a specific type in the taken image as a to-be-processed area of an image conversion process in accordance with the size of the photographed-subject image if the result of the analysis indicates that the photographed-subject image exists in the taken image; and a conversion section configured to carry out the image conversion process on the photographed-subject image with the pixel area thereof used as the to-be-processed area in order to generate a post-conversion image obtained as a result of the image conversion process.

The technical term 'to-be-processed area' used in the following description as an area of an image conversion process is defined as an area to be processed in the image conversion process. The to-be-processed area setting section produces a result of determination as to whether the size of a photographed-subject image of a specific type in the taken image is small or large. If the result of the determination indicates that the size of the photographed-subject image of a specific type is small, the to-be-processed area setting section uses the pixel area of the photographed-subject image as a to-be-processed area of an image conversion process. As an alternative, if the result of the determination indicates that the size of a photographed-subject image of a specific type is large, the to-be-processed area setting section uses the pixel area of the photographed-subject image as the to-be-processed area.

The to-be-processed area setting section produces a result of determination as to whether the taken image is an image taken in a manual photographing with a timing set by a manual operation or an image taken in an automatic photographing carried out automatically. If the result of the determination indicates that the taken image is an image taken in a manual photographing with a timing set by a manual operation, the to-be-processed area setting section uses the pixel area of the photographed-subject image of a specific type in the taken image as a to-be-processed area of an image conversion process provided that the size of an photographed-subject image is small. If the result of the determination indicates that the taken image is an image taken in an automatic photographing, on the other hand, the to-be-processed area setting section uses the pixel area of the photographed-subject image of a specific type in the taken image as the to-be-processed area provided that the size of an photographed-subject image is large.

A photographed-subject image of a specific type in the taken image is an image of the face of a person or an image of a copyrighted work.

As the image conversion process, the conversion section caries out processing to convert the photographed-subject image with the pixel area thereof used as the to-be-processed area into an image which cannot be recognized or is difficult to recognize. As an alternative to the image conversion process, the conversion section caries out processing to replace the photographed-subject image with the pixel area thereof used as the to-be-processed area with another image.

As another alternative to the image conversion process, the conversion section caries out processing to replace a face image with the pixel area thereof used as the to-be-processed area with another image in accordance with a result of recognizing attributes of a person whose face is shown by the face image or a result of recognizing a facial expression of the face.

The taken-image acquisition section has an imaging unit for carrying out an image pickup process to acquire an image of a photographic object. The imaging unit has a configuration including typically a CCD or CMOS sensor which serves as an imaging device.

On top of that, the taken-image acquisition section also has a communication unit for carrying out a communication with an external apparatus in order to acquire and receive a taken image from the external apparatus.

In addition, the taken-image acquisition section also includes a reproduction unit for reproducing information from a portable recording medium in order to acquire a taken image as a result of the reproduction of information from the portable recording medium.

On top of that, the image-processing apparatus also has a storage processing section for carrying out a storing process to store an image generated as a result of a process carried out by the conversion section.

The storage processing section includes a recording unit for recording information onto a recording medium. The recording unit carries out the storing process to store an image generated as a result of a process carried out by the conversion section into the storage medium.

On top of that, the storage processing section also has a communication unit for carrying out a communication with an external apparatus. In the storing process, the communication unit transmits an image generated as a result of a process carried out by the conversion section to the external apparatus.

On top of that, the image-processing apparatus also has an image output section for carrying out a process to output an image generated as a result of a process carried out by the conversion section.

The image output section has a display unit. In the process to output an image generated as a result of a process carried out by the conversion section, the image is output to the display unit for displaying the image.

In addition, the image output section also has a communication unit for carrying out a communication with an external apparatus. In the process to output an image generated as a result of a process carried out by the conversion section, the communication unit transmits the image to the external apparatus.

On top of that, the image output section includes a recording unit for recording information onto a portable recording medium. In the process to output an image generated as a result of a process carried out by the conversion section, the recording unit stores the image into the portable storage medium.

In accordance with another embodiment of the present invention, there is provided an image processing method including:

a taken-image acquisition step of acquiring a taken image;

a to-be-processed area setting step of carrying out an analysis on a taken image acquired at the taken-image acquisition step and using the pixel area of a photographed-subject image of a specific type in said taken image as a to-be-processed area of an image conversion process in accordance with the size of the photographed-subject image if the result of the analysis indicates that the photographed-subject image exists in the taken image; and a conversion step of carrying out the image conversion process on the photographed-subject image with the pixel area thereof used as the to-be-processed area in order to generate an image as a result of the image conversion process.

That is to say, in accordance with the present invention, a to-be-processed area of an image conversion process is set in an image taken in a photographing as follows. For example, a photographed-subject image of a specific type is extracted from the image taken in a photographing and a result of determination is produced as a result of determination as to whether or not the extracted photographed-subject image of a specific type is to be used as a to-be-processed area of an image conversion process on the basis of the size of the photographed-subject image. Examples of the photographed-subject image of a specific type are an image of the face of a person or an image of a copyrighted work. Then, a small area included in the taken image as the area of a face or the area of a copyrighted work is used as a to-be-processed area of an image conversion process. As an alternative, conversely, a large area included in the taken image as the area of a face or the area of a copyrighted work is used as the to-be-processed area.

In addition, in the case of an image pickup apparatus capable of carrying out both a manual photographing and an automatic photographing, a small area included in an image taken in a manual photographing as the area of a face or the area of a copyrighted work is used as a to-be-processed area of an image conversion process. On the other hand, a large area included in an image taken in an automatic photographing as the area of a face or the area of a copyrighted work is used as the to-be-processed area. A manual photographing is a photographing carried out typically with a timing determined by a shutter operation performed by the user. On the other hand, an automatic photographing is a photographing carried out in an automatic way which the user is not aware of.

In the image conversion process, the conversion section caries out processing to convert the photographed-subject image with the pixel area thereof used as the to-be-processed area into an image which cannot be recognized or is difficult to recognize. As an alternative to the image conversion process, the conversion section caries out processing to replace the photographed-subject image with the pixel area thereof used as the to-be-processed area with another image. It is assumed that examples of the processing to convert the photographed-subject image with the pixel area thereof used as the to-be-processed area into an image which cannot be recognized or is difficult to recognize are a mosaic generating process, a soft focusing process, an image encryption process (also referred to as an image scrambling process) and a process to add eye lines or the like to an image of a face. On the other hand, it is assumed that, in the image replacement processing, an image of a face (or a copyrighted work) with the pixel area thereof used as the to-be-processed area is replaced with an animation image or any of a variety of other images.

In accordance with the present invention, an image conversion process is carried out on a specific partial image included in a whole image typically taken in photographing as a photographed-subject image of a specific type in accordance with the size of the photographed-subject image. As described earlier, examples of the photographed-subject image of a specific type are an image of the face of a person and an image of a copyrighted work. In the image conversion process, the conversion section caries out processing to convert the photographed-subject image with the pixel area thereof used as a to-be-processed area into an image which cannot be recognized or is difficult to recognize. As an alternative to the image conversion process, the conversion section caries out processing to replace the photographed-subject image with another image. As a result, it is possible to carry out proper image processing, of which the user is not aware in particular, on the taken image.

For example, an image taken by the user in a manual photographing includes an image of typically a desired person serving as the main object of photographing. In this case, however, an image of another person or the like may be taken inadvertently in the background of the main object of photographing, possibly raising a problem. In such a case, it is proper to carry out a mosaic generating process or the like on a small image included in the background as an image of the face of the other person.

In addition, an image obtained as a result an automatic photographing in which the user is not aware of a shutter operation may include an image not intended by the user as a large image of the face of a person or a copyrighted work. In this case, it is proper to carry out a mosaic generating process or the like on the large image of which the user is not aware. In accordance with the present invention, such image processing is implemented.

BRIEF DESCRIPTION OF THE DRAWINGS

FIG. 3 is an explanatory diagram showing a data structure in which taken images and post-conversion images are stored in a memory in accordance with an embodiment of the present invention;

FIG. 5A is an explanatory diagram showing a typical image taken by a user in a manual photographing as an image of the face of a particular person serving as the desired object of photographing;

FIG. 5B is an explanatory diagram showing to-be-processed areas ARi which are each the pixel area of a face image inadvertently included in the taken image shown in FIG. 5A;

FIG. 5C is an explanatory diagram showing a result of a mosaic generating process carried out as an image conversion process on each of the to-be-processed areas ARi shown in FIG. 5B;

FIG. 6A is an explanatory diagram showing a typical image taken by a user in an automatic photographing as an image of the face of a particular person serving as the desired object of photographing;

FIG. 6B is an explanatory diagram showing a to-be-processed area ARi which is the pixel area of a face image inadvertently included in the taken image shown in FIG. 6A;

FIG. 6C is an explanatory diagram showing a result of a mosaic generating process carried out as an image conversion process on the to-be-processed area ARi shown in FIG. 6B;

FIG. 16A shows a flowchart representing a still further operation procedure carried out by the image pickup apparatus according to an embodiment;

FIG. 16B shows a flowchart representing a still further operation procedure carried out by the image pickup apparatus according to an embodiment;

FIG. 16C shows a flowchart representing a still further operation procedure carried out by the image pickup apparatus according to an embodiment;

FIG. 16D shows a flowchart representing a still further operation procedure carried out by the image pickup apparatus according to an embodiment.

DETAILED DESCRIPTION OF THE PREFERRED EMBODIMENTS

The following description explains embodiments implementing the image-processing apparatus and the image processing method, which are provided by the present invention. In the following description, an image pickup apparatus is taken as an example of the image-processing apparatus. It is to be noted that a later description explains a typical modification and/or a typical extension which allow the image-processing apparatus provided by the present invention to be implemented as an apparatus other than the image pickup apparatus.

The image pickup apparatus is explained in chapters arranged in the following order:
1: Typical External View of the Image Pickup Apparatus
2: Typical Configuration of the Image Pickup Apparatus
3: Typical Image Processing
4: Processing of an Image Analysis/Conversion Section
5: Processing According to Human Attributes/Facial Expressions
6: Processing Objects Other than Face Images
7: Typical Operation Procedures
8: Effects of the Embodiment, Typical Modifications and Typical Extensions
1: Typical External View of the Image Pickup Apparatus An image pickup apparatus 1 according to an embodiment of the present invention can have a variety of presumable configurations, typical ones of which are shown in FIGS. 1A, 1B, 1C and 1D.

Figure 1A:
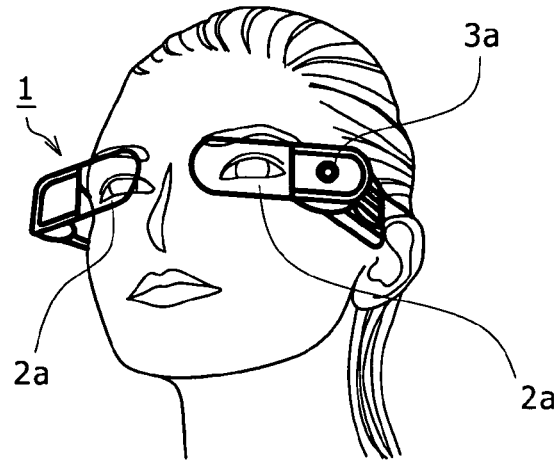
FIG. 1A is a diagram showing an external view of an image pickup apparatus designed as a camera of a spectacles type in accordance with an embodiment of the present invention.

FIG. 1A is a diagram showing an image pickup apparatus 1 designed as a camera of a spectacles type. The image pickup apparatus 1 typically has a mounting unit with a half-cycle frame structure going half around the back portion of the head of a user from one side of the head to the other side. As shown in the figure, the user wears the image pickup apparatus 1 by putting the half-cycle frame structure on the ear conches.

With the image pickup apparatus 1 worn by the user as shown in FIG. 1A, an image taking lens 3a of the image pickup apparatus 1 is oriented in the forward direction so as to allow the image pickup apparatus 1 to take an image of a photographic object by setting the eyesight direction of the user as the image taking direction.

In addition, with the image pickup apparatus 1 mounted as shown in FIG. 1A, a pair of right and left display panel units 2a provided for the right and left eyes respectively are placed at locations right in front of the right and left eyes respectively. That is to say, in this state of the image pickup apparatus 1, the pair of right and left display panel units 2a is placed at the positions of ordinary spectacles. Each of the display panel units 2a is typically a liquid-crystal panel. By controlling the transmissivity of the display panel units 2a, a through state like one shown in the figure can be established. That is to say, either a transparent state or a semi-transparent state can be established. With the display panel units 2a put in a through state, the user can do day-to-day activities with no difficulty in the same way as if the user were wearing a pair of spectacles.

It is to be noted that, instead of providing a pair of right and left display panel units 2a for the right and left eyes respectively, only one display panel unit 2a can conceivably be provided for one of the eyes.

Figure 1B:
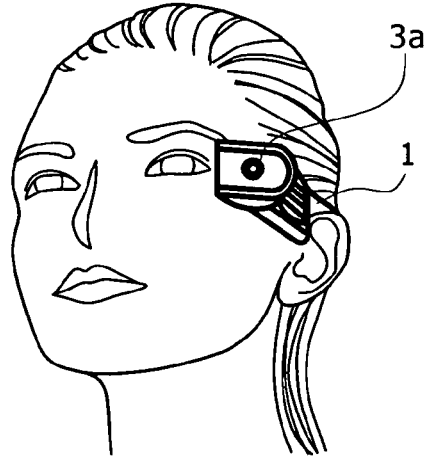
FIG. 1B is a diagram showing an external view of an image pickup apparatus designed as a camera of a single-spectacle type in accordance with an embodiment of the present invention.

Much like FIG. 1A, FIG. 1B is a diagram showing an image pickup apparatus 1 mounted on the head of a user. In the case of the image pickup apparatus 1 shown in FIG. 1B, however, the image pickup apparatus 1 has a configuration excluding the display panel units 2a shown in FIG. 1A. Typically, the user wears the image pickup apparatus 1 on the head by putting the mounting unit on the conch of one ear. In this state, an image taking lens 3a of the image pickup apparatus 1 is oriented in the forward direction so as to allow the image pickup apparatus 1 to take an image of a photographic object by setting the eyesight direction as the image taking direction.

As described above, FIGS. 1A and 1B each show an image pickup apparatus 1 mounted on the head of a user by making use of a mounting unit of the spectacles type or the head-mounted type. However, the mounting unit can have any of numerous conceivable structures utilized by the user for wearing the image pickup apparatus 1. Typical conceivable structures of the mounting unit employed in an image pickup apparatus 1 include structures of a headphone type, a neckband type and an behind-the-ears mounting type which allow the user to wear the image pickup apparatus 1. In addition, the image pickup apparatus 1 can also be typically attached to an ordinary pair of spectacles, ordinary visors or an ordinary headphone by making use of attachment fittings such as a clip in order for a user to wear the image pickup apparatus 1. Moreover, the image pickup apparatus 1 does not have to be mounted on the head of a user.

Furthermore, even though the image pickup apparatus 1 described above has a configuration taking the eyesight direction of the user as the image taking direction, the image pickup apparatus 1 may also have another configuration in which the image taking lens 3a is oriented for example in the backward, side, upward or downward direction of the user when the image pickup apparatus 1 is worn by the user so that the backward, side, upward or downward direction is taken as the image taking direction. On top of that, it is also possible to conceive a configuration including a plurality of photographing systems having the same image taking direction or different image taking directions.

In addition, it is also possible to provide a variable image taking direction mechanism capable of manually or automatically changing the direction toward an object of photographing for one image taking lens 3a or a plurality of image taking lens 3a.

Figure 1C:
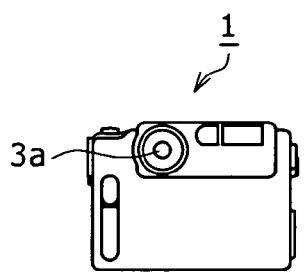
FIG. 1C is a diagram showing an image pickup apparatus having the same configuration as the generally known digital camera.

FIG. 1C is a diagram showing an image pickup apparatus 1 having the same configuration as the generally known digital camera. On the other hand, FIG. 1D is a diagram showing an image pickup apparatus 1 having the same configuration as the generally known video camera.

Figure 1D:
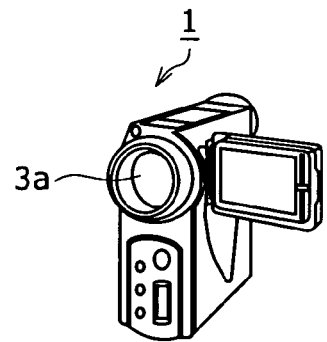
FIG. 1D is a diagram showing an image pickup apparatus having the same configuration as the generally known video camera.

The image pickup apparatus 1 each shown in FIGS. 1C and 1D as an apparatus that can be carried by a user are each an embodiment of the present invention too. Even though the figures each show only an image taking lens 3a as a component of the image pickup apparatus 1, the image pickup apparatus 1 also employ display devices such as a panel display unit for monitoring an object of photographing and a view finder.

It is to be noted that embodiments other than the image pickup apparatus 1 shown in FIGS. 1A, 1B, 1C and 1D are of course conceivable as the image pickup apparatus for photographing still images or recording movies. For example, the other implementations include hand phones, PDAs (Personal Digital Assistants) and portable personal computers. An apparatus having the function of an image pickup apparatus can also be assumed to be an image pickup apparatus 1 according to an embodiment of the present invention.

In addition, these embodiments may typically employ a microphone for receiving sounds generated by external sources. Thus, with such a microphone, the image pickup apparatus 1 is capable of receiving an analog signal to be recorded in a memory along with a taken image in a photographing. On top of that, the embodiments may also each be provided with a sound output unit such as a speaker and an earphone.

In addition, it is also conceivable to provide each of the embodiments with a configuration employing an illumination unit in the vicinity of the image taking lens 3a as a unit for illuminating an object of photographing. An example of the illumination unit is an LED (Light Emitting Diode). Furthermore, it is also conceivable to provide each of the embodiments with a configuration employing a flash generating unit in the vicinity of the image taking lens 3a as a unit used in a photographing to take an image of a standstill object of photographing.

2: Typical Configuration of the Image Pickup Apparatus

Figure 2:
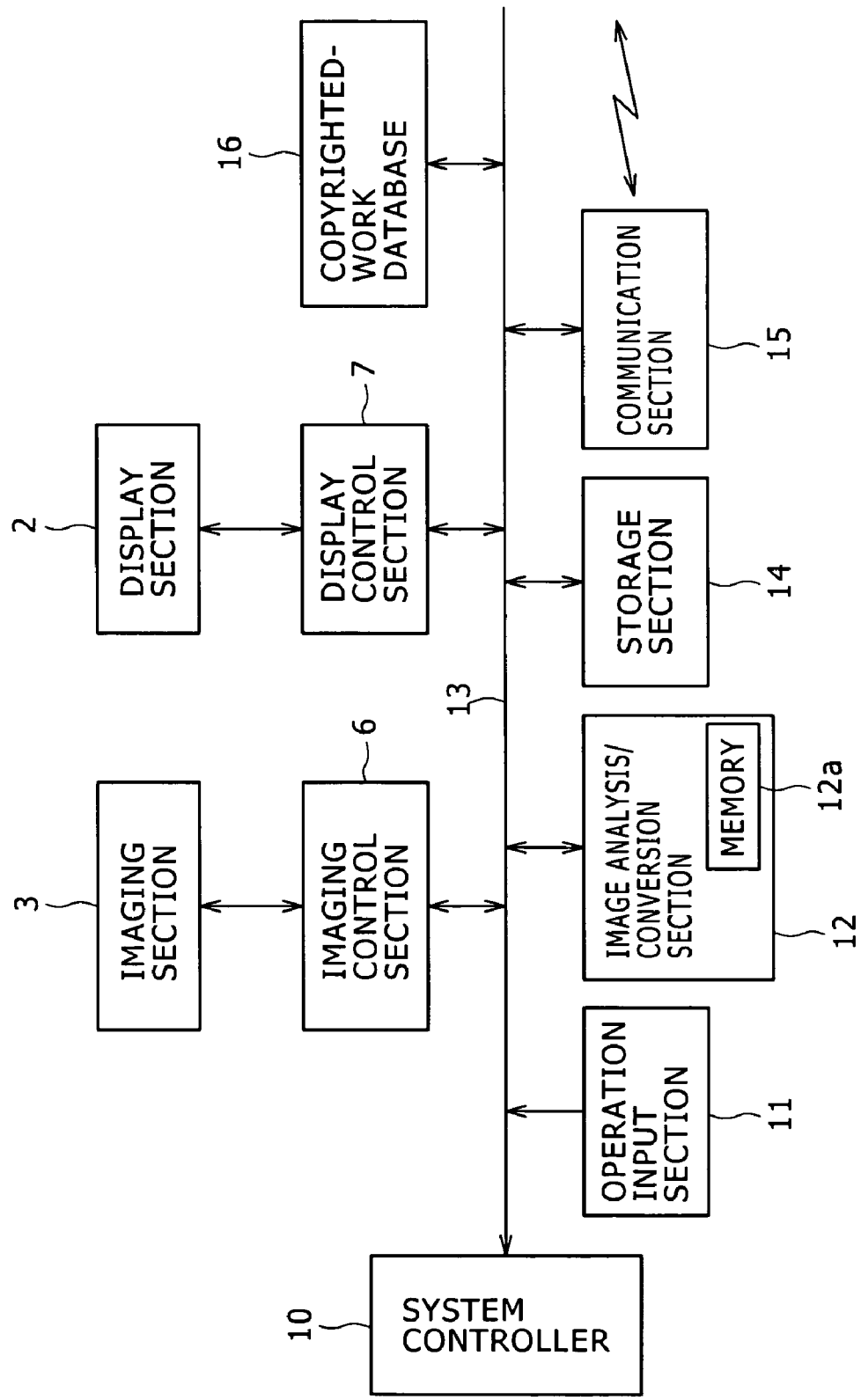
FIG. 2 is a block diagram showing an image pickup apparatus according to an embodiment of the present invention.

A typical configuration of the image pickup apparatus is explained by referring to FIG. 2.

A system controller 10 is typically a microcomputer employing a CPU (Central Processing Unit), a ROM (Read Only Memory), a RAM (Random Access Memory), a nonvolatile memory unit and an interface unit. The system controller 10 is a control section for controlling all other sections employed in the image pickup apparatus 1. In the system controller 10, the CPU executes programs stored internally in the ROM in advance, exchanging control signals with the other sections through a bus 13 in order to drive each of the other sections to carry out a necessary operation.

An imaging section 3 employs an imaging optical system, an imager unit and an imaging signal processing unit.

The imaging optical system employed in the imaging section 3 includes a lens system and a driving system for driving the lens system to carry out a focus operation and a zoom operation. The lens system has the image taking lens 3a shown in FIG. 1, a stop, a zoom lens and a focus lens.

The imager unit employed in the imaging section 3 includes an array of solid-state imagers for detecting imaging light beams output by the imaging optical system and carrying out an opto-electrical conversion process to convert the imaging light beams into an imaging signal. Examples of the array of solid-state imagers are an array of CCD (Charge Couple Device) sensors and an array of CMOS (Complementary Metal Oxide Semiconductor) sensors.

The imaging signal processing unit employed in the imaging section 3 includes a sample-hold/AGC (Automatic Gain Control) circuit and a video A/D (Analog/Digital) converter. The sample-hold/AGC circuit is a circuit for adjusting a gain for the signal output by the imager unit and shaping the wave of the signal. The video A/D converter is a circuit for converting an analog signal output by the sample-hold/AGC circuit into digital data representing the image taken by the imaging optical system in a photographing. In addition, the imaging signal processing unit carries out processing such as a white balance process, a luminance process, a color signal process and a hand-trembling compensation process on the taken image.

Thus, as described above, the imaging section 3 employing the imaging optical system, the imager unit and the imaging signal processing unit carries out imaging process and generates an image taken in a photographing.

An image generated as a result of the imaging process carried out by the imaging section 3 is supplied to an imaging control section 6. In accordance with control executed by the system controller 10, the imaging control section 6 carries out a process to convert the format of the data representing the received image into an image-data format determined in advance. Then, in accordance with an operation state, the imaging control section 6 supplies the image having the post-conversion format to an image analysis/conversion section 12, a storage section 14, a communication section 15 and a display control section 7.

In addition, on the basis of a command received from the system controller 10, the imaging control section 6 also carries out processing including control to turn on and off an imaging operation carried out by the imaging section 3, control to drive the zoom and focus lenses employed in the imaging optical system, control of the sensitivity and frame rate of the imager unit, control of a variety of parameters used in processing carried out by the imaging signal processing unit and a process to set executions.

By the way, the image pickup apparatus 1 can be made capable of carrying out both manual image pickup operations and automatic image pickup operations.

A manual image pickup operation is defined as an image pickup operation carried out in accordance with user operations in order to take an image. Examples of the manual image pickup operation are a shutter operation to take a still image and a start operation to take a moving image.

On the other hand, an automatic image pickup operation is defined as an image pickup operation carried out not on the basis of a user operation to determine an image-pickup timing. Examples of the automatic image pickup operation are a periodical operation to take images, an image pickup operation based on a trigger other than a trigger generated by the user intentionally and an operation to take images on a steady basis as long as the power supply is in an on state. That is to say, an automatic image pickup operation can be said to be an operation to take an image with a timing which the user is not aware of.

In the case of a manual image pickup operation, the system controller 10 gives an imaging command to the imaging control section 6 when the user carries out an operation intentionally on an operation input section 11 to be described later.

In the case of an automatic image pickup operation, on the other hand, the system controller 10 gives an imaging command to the imaging control section 6 periodically or on the basis of a detected trigger other than a trigger generated by the user intentionally.

The image pickup apparatus 1 shown in FIGS. 1A, 1B, 1C and 1D are each a proper apparatus for carrying out a manual image pickup operation. However, the image pickup apparatus 1 shown in FIGS. 1A and 1B are each also a proper apparatus for carrying out an automatic image pickup operation in order to take images of the loci of daily behaviors displayed by the user.

It is to be noted that the embodiments of the present invention are also each assumed to implement an image pickup apparatus 1 for carrying out only a manual image pickup operation or for carrying out only an automatic image pickup operation.

The image analysis/conversion section 12 is a unit for carrying out analyses and conversion processes on an image taken by the image pickup apparatus 1 in a photographing and outputting an image obtained as a result of the conversion process.

For example, the image analysis/conversion section 12 analyzes a taken image output by the imaging section 3 in order to detect a to-be-processed area in the image. The to-be-processed area in a taken image is defined as an area to be further processed after the analysis as follows. The image analysis/conversion section 12 carries out image conversion processing on a photographed-subject image of a specific type in the taken image in order to generate a post-conversion image. The photographed-subject image subjected to the image conversion processing has its pixel area used as the detected to-be-processed area. In the following description, such a photographed-subject image is referred to as a photographed-subject image in the detected to-be-processed area. Examples of the image conversion processing are a mosaic generating process, a soft focusing process, an encryption process (also referred to as a scrambling process) and a process to add eye lines or the like to the image of a face.

As an alternative to the image conversion processing, the image analysis/conversion section 12 may also carry out image replacement processing to replace the photographed-subject image in the to-be-processed area with another image. For example, an image of a face (or a copyrighted work) in the to-be-processed area is replaced with an animation image or any of a variety of other images.

It is to be noted that the other images such as an animation image used for replacing a photographed-subject image in the to-be-processed area have been stored in advance in a memory 12a employed in the image analysis/conversion section 12. The memory 12a is typically a ROM or a flash memory. It is also conceivable, however, to replace a photographed-subject image in a to-be-processed area with another image which is read out from the storage section 14 to be described later or received by the communication section 15 also to be described later.

As described above, an image processed by the image analysis/conversion section 12 is typically an image output by the imaging section 3 as a standstill or moving image. However, an image processed by the image analysis/conversion section 12 can also be an image obtained in a different way.

To be more specific, the image pickup apparatus 1 may receive an image taken by an external image pickup apparatus. In this case, the communication section 15 employed in the image pickup apparatus 1 receives the image taken by the external image pickup apparatus directly from the external image pickup apparatus or through a server.

As an alternative, the image taken by the external image pickup apparatus is recorded on a portable recording medium and, when the portable recording medium is mounted on the image pickup apparatus 1, the storage section 14 reproduces the image in a process to acquire the image. In this case, it is assumed that the storage section 14 has a function to reproduce an image from the portable recording medium.

Thus, an image received by the communication section 15 from an external image pickup apparatus or read out by the communication section 15 from a portable recording medium in a reproduction process can be handled as an image to be processed by the image analysis/conversion section 12.

The image analysis/conversion section 12 can be typically composed of a microprocessor or a DSP (Digital Signal Processor) functioning as a video processor. In the image pickup apparatus 1 shown in FIG. 2, the image analysis/conversion section 12 is shown as a block physically separated from the system controller 10; the functions of the image analysis/conversion section 12 can also be carried out by execution of software invoked in the system controller 10.

Processing to determine a to-be-processed area of an image conversion process and image conversion processing which are carried out by the image analysis/conversion section 12 will be described later in detail.

The configuration of the image pickup apparatus 1 includes a display section 2 and a display control section 7 which are units for displaying information to the user. The display section 2 employs a display panel unit 2a and a display driving unit for driving the display panel unit 2a. As described earlier, the display panel unit 2a is typically a liquid-crystal panel.

The display driving unit is a pixel driving circuit for displaying an image output by the imaging control section 6 on the display panel unit 2a, which is typically a liquid-crystal panel. To put it concretely, in order to display the image output by the imaging control section 6 on the display panel unit 2a, the pixel driving circuit applies a driving signal based on a video signal representing the image to each of pixels laid out on the display panel unit 2a to form a matrix. The pixel driving circuit applies a driving signal to each of pixels with a horizontal/vertical driving timing determined in advance for the pixel.

On the basis of control executed by the system controller 10, the display control section 7 drives the pixel driving circuit employed in the display section 2 in order to show a display determined in advance on the display panel unit 2a. Typically, the display determined in advance is an image obtained as a result of image-taking monitoring carried out by the imaging section 3, an image obtained as a result of a reproduction process carried out by the storage section 14 on an image recording medium, an image received by the communication section 15 from an external source or a display of a variety of characters.

In addition, in order to show such a display on the display panel unit 2a, the display control section 7 typically carries out various kinds of processing such as processes to adjust the level of luminance of the display, the display contrast and the image sharpness as well as a color correction process.

On top of that, in accordance with a command received from the system controller 10, the display control section 7 controls the display driving circuit employed in the display section 2 in order to control the transmissivity of each pixel employed in the display panel unit 2a. In this way, it is possible to establish a though state (a transparent state or a semi-transparent state).

The storage section 14 is a unit for storing various kinds of data such as a taken image and a post-conversion image generated by the image analysis/conversion section 12. The storage section 14 can be composed of a solid-state memory such as a RAM or a flash memory, or a HDD (Hard Disk Drive).

As an alternative, the storage section 14 can be a recording/reproduction drive for recording data onto a portable recording medium such as a memory card, an optical disk, a magnetic disk, a magneto-optical disk or a hologram memory and reproducing data from the medium. A memory card is a card having an embedded solid-state memory.

It is needless to say that the storage section 14 can be configured to include both the internal memory, which can be a solid-state memory or a hard disk driven by an HDD (Hard Disk Drive) as described above, and the recording/reproduction drive for a portable recording medium.

On the basis of control executed by the system controller 10, the storage section 14 stores a taken image and/or a post-conversion image in the memory described above. In addition, also on the basis of control executed by the system controller 10, the storage section 14 reads out an image from the memory, supplying the image to other sections such as the system controller 10 and/or the display control section 7.

Taken images and post-conversion images are stored in the storage section 14 in a data structure like one shown in FIG. 3.

First of all, the storage section 14 stores a taken image. This taken image stored in the storage section 14 is typically a taken image obtained as a result of an image pickup process carried out by the imaging section 3, a taken image received by the communication section 15 from an external apparatus or a taken image read out by the storage section 14 from an image recording medium. In the example shown in FIG. 3, the taken images stored in the storage section 14 are taken images VD1, VD2, ... and VDn in respectively entries #1, #2, ... #n of the data structure. In addition, the taken images VD1, VD2, ..., and VDn are associated with respectively pieces of image management information C1, C2, ... and Cn, and the image management information C1, C2 ... and Cn are stored in the data structure in the storage section 14. Image management information Ci assigned to a taken image VDi typically includes the file name of the taken image VDi, the type of the taken image VDi, the data size of the taken image VDi, the compression method of the taken image VDi and an identification identifying an apparatus used for taking the taken image VDi (variable i represents an integer from 1 to n). The type of a taken image VDi indicates whether the taken image VDi is a standstill or a moving image. In addition, image management information Ci assigned to a taken image VDi may also include an imaged date/time at which the image VDi was taken and an imaged place at which the image VDi was taken at the imaged date/time. Usually, the imaged date/time is expressed in terms of years, months, days, hours and seconds. Detected by a position detection section 17 at the image-taking date/time, the imaged place is normally expressed in terms of a latitude and a longitude.

On top of that, image management information Ci assigned to a taken image VDi may also particularly include information indicating whether the image VDi was taken in a manual or automatic photographing. If the image VDi has been taken in an automatic photographing by making use of the image pickup apparatus 1 for example, the system controller 10 adds information indicating that the image VDi has been taken in an automatic photographing to the image management information Ci and stores the information Ci in the storage section 14. It is needless to say that, if the image VDi has been taken in a manual photographing, on the other hand, the system controller 10 adds information indicating that the image VDi has been taken in a manual photographing to the image management information Ci before storing the information Ci in the storage section 14.

As shown in the figure, a post-conversion image cVDi is stored in the data structure in the storage section 14 by associating the image cVDi with an original taken image VDi, which was converted by the image analysis/conversion section 12 into the image cVDi. Thus, post-conversion images cVD1, cVD2, ... and CVDn are stored in the data structure in the storage section 14 by associating the images cVDi with original taken images VD1, VD2, ... and VDn respectively.

To put it more concretely, let us assume for example that the image analysis/conversion section 12 converts a taken image VD1 into a post-conversion image cVD1. In this case, the post-conversion image cVD1 is stored in the data structure in the storage section 14 by associating the image cVD1 with the original taken image VD1.

It is to be noted that a taken image can be converted into a plurality of post-conversion images. Also in this case, each of the post-conversion images is stored in the data structure in the storage section 14 by associating the post-conversion image with the original taken image.

In addition, in the example shown in FIG. 3, both taken images and post-conversion images are stored in the storage section 14. However, it is conceivable to provide a configuration in which no taken images are stored in the storage section 14, that is, only post-conversion images are stored in the storage section 14, or a configuration in which no post-conversion images are stored in the storage section 14, that is, only taken images are stored in the storage section 14.

The communication section 15 is a unit for carrying out a communication with an external apparatus in order to exchange data with the apparatus. The communication section 15 can be configured to carry out a network communication through a short-distance radio communication with typically a network access point by adoption of a radio LAN (Local Area Network) method, a blue-tooth method or the like. As an alternative, the communication section 15 carries out a direct radio communication with the external apparatus which has a communication function.

In addition, the communication with the external apparatus does not have to be a radio communication. That is to say, the communication section 15 may also carry out a wire communication with the external apparatus connected to the image pickup apparatus 1 by using a communication line.

An external apparatus communicating with the communication section 15 can presumably be a server, a display apparatus, another image pickup apparatus or a storage apparatus.

In addition, the image pickup apparatus 1 also employs a copyrighted-work database 16. The copyrighted-work database 16 is used for storing images of notable copyrighted works such as a variety of paintings, designs as well as jacket pictures of package recording mediums such as a CD and a DVD. For example, a painting or the like has been included in an image taken in a photographing as a photographed-subject image. In this case, the painting included in the taken image as a photographed-subject image is collated with registered images stored in the copyrighted-work database 16 in order to produce a result of determination as to whether or not the painting is a prominent copyrighted work, that is, whether or not it is necessary to carry out an image conversion process on the painting.

The copyrighted-work database 16 is typically a solid-state memory such as a flash memory or a hard disk driven by an HDD. As an alternative, the copyrighted-work database 16 can be configured as a recording/reproduction drive for driving a portable recording medium. In addition, the copyrighted-work database 16 is a unit physically separated from the storage section 14 in the image pickup apparatus 1 shown in FIG. 2. Instead of physically separating the copyrighted-work database 16 from the storage section 14, an area in an image recording medium in the storage section 14 can be allocated to copyrighted-work images that would otherwise be stored in the copyrighted-work database 16.

The image pickup apparatus 1 also employs an operation input section 11 to be operated by the user to enter an input. The operation input section 11 is configured to have operation devices such as keys and a dial. In such a configuration, an operation carried out by the user on a key is detected. As an alternative, the operation input section 11 is configured to detect a behavior displayed intentionally by the user. If the operation input section 11 is configured to have operation devices, the keys are operated by the user for example to turn on or off a power supply, to drive the imaging system or to carry out a display related operation. Typically, the imaging system is driven in order to carry out a shutter operation, a zoom operation or an operation to enter a signal processing command. Examples of the display related operation are an operation to select contents of a display and an operation to adjust a display.

In addition, a touch pad and/or a touch panel can be provided as operation devices. For example, a touch panel is provided on the display section 2. In this case, an operation carried out by the user to touch a displayed screen on the display section 2 is regarded as an operation to enter an input.

On top of that, a touch panel, arrow keys, a jog dial or the like can be provided to serve as an operation device to be operated by the user to move a pointer such as a cursor over the screen. As an alternative, a remote controller including an embedded device such as an angular velocity sensor or an acceleration sensor can be provided. In this case, the user holds the remote controller in its hand and operates the remote controller in order to move the pointer such as the cursor over the screen.

If the image pickup apparatus 1 shown in FIG. 1C or 1D is taken into consideration for example, operating operation devices such as an operation key, a dial and a touch panel are appropriate devices to be operated by the user to carry out a variety of operations.

If the image pickup apparatus 1 shown in FIG. 1A or 1B is used as an apparatus to be mounted on a head, on the other hand, operating operation devices such as an operation key, a dial and a touch panel can be provided or a configuration making use of a remote controller can be assumed. If the difficulty to provide a number of operation devices is taken into consideration, however, it is appropriate to provide a configuration in which a behavior of the user is detected and regarded as an operation input.

In the case of the configuration for detecting a behavior displayed by the user, it is conceivable to provide sensors such as an acceleration sensor, an angular velocity sensor, a vibration sensor and a pressure sensor. For example, when the user lightly hits a side surface the image pickup apparatus 1, generating a ticktock sound, the behavior of the user is detected by a sensor such as an acceleration or vibration sensor and, if the detected horizontal acceleration exceeds a value determined in advance for example, the system controller 10 detects the behavior of the user as an operation. In addition, an acceleration or angular-velocity sensor is capable of producing a result of determination as to whether a side portion of the image pickup apparatus 1 has been hit by the user in the left or right direction. In this case, a user behavior to hit a side of the image pickup apparatus 1 in the left or right direction can be regarded as an operation determined in advance. By a side portion of the image pickup apparatus 1, a rod of the pair of spectacles is meant.

In addition, a user behavior to rotate or shake the head is detected by an acceleration or angular-velocity sensor and recognized by the system controller 10 as an operation carried out by the user.

On top of that, a pressure sensor is provided typically on each of the right and left side portions of the image pickup apparatus 1, that is, the right and left rods of the pair of spectacles. In this case, when the user presses the right side portion of the image pickup apparatus 1 by making use of a finger for example, the behavior of the user is regarded as typically a zoom operation in the telescopic direction. When the user presses the left side portion of the image pickup apparatus 1 by making use of a finger, on the other hand, the behavior of the user is regarded as typically a zoom operation in the pantoscopic direction.

In addition, it is also possible to provide a configuration including biological sensors. In this configuration, a biological sensor detects biological information of the user and the detected information is regarded as an operation input. The biological information includes the number of pulses, the number of heart beats, a cardiac electrogram, an electromyogram, respiratory information, diaphoresis information, a GSR (eletrodermal reaction), blood pressures, a blood oxygen saturation concentration, a skin surface temperature, information on brain waves, blood flow changes and an eye state. The respiratory information includes a respiratory rate, a respiratory depth and a respiratory volume. The brain waves are α, β, θ and δ waves.

Then, the system controller 10 recognizes information detected by a biological sensor as an operation input entered by the user. For example, a movement of an eye can be conceived as a behavior intentionally displayed by the user. Examples of the movement of an eye are a change in line of sight and a wink. A detected behavior displayed by the user to wink three times is typically determined to be a specific operation input. In addition, it is also possible to provide a configuration in which detected biological information can be interpreted as an action taken by the user to mount the image pickup apparatus 1 on the head or remove the image pickup apparatus 1 from the head or as an action taken by a special user to mount the image pickup apparatus 1 on the head. When an action taken by a user to mount the image pickup apparatus 1 on the head is detected, the system controller 10 turns on the power supply. When an action taken by a user to remove the image pickup apparatus 1 from the head is detected, on the other hand, the system controller 10 turns on the power supply.

It is to be noted that a biological sensor can be provided on the inner side of the mounting frame portion of the image pickup apparatus 1 of the spectacles type. In this configuration, when the user touches a side portion of the head or the back portion thereof, the biological sensor is capable of detecting information on a variety of actions each taken by the user. As an alternative, it is also possible to provide a configuration in which a biological sensor is attached to a predetermined location on the body of the user separately from the mounting frame portion of the image pickup apparatus 1.

In addition, it is also conceivable to make use of a camera for taking an image of the eyes of the user in order to detect the state and/or movement of any of the eyes or detect the state of its pupil.

The operation input section 11 provides the system controller 10 with information on an action and/or a behavior which are detected by an operation device or a sensor such as an acceleration sensor, an angular velocity sensor, a vibration sensor, a biometrics sensor or a pressure sensor as described above. The system controller 10 then recognizes the action taken by the user or the behavior displayed by the user on the basis of the information received from the operation input section 11.

It is to be noted that, as a mechanism for detecting a behavior displayed by the user, another sensor can be further provided. Examples of the other sensor are a sensor for detecting a voice of the user and a sensor for detecting a movement of the tongue of the user.

The configuration described above as a configuration of the image pickup apparatus 1 is no more than a typical configuration. It is conceivable to add a variety of elements to the typical configuration and eliminate a variety of elements from the typical configuration in accordance with operations and/or functions which are to be actually carried out by the image pickup apparatus 1.

FIG. 4 is a variety of diagrams showing typical relations between operations carried out by the image pickup apparatus 1 and an external apparatus.

Figure 4A:
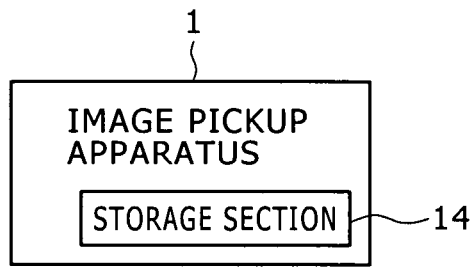
FIG. 4A is a diagram showing an operation carried out by only an image pickup apparatus functioning as a standalone apparatus.

To be more specific, FIG. 4A is a diagram showing an operation carried out by only the image pickup apparatus 1 functioning as a standalone apparatus. An example of the operation carried out by only the image pickup apparatus 1 functioning as a standalone apparatus is a process to convert a taken image obtained as a result of an image pickup operation into another image. Another example of the operation carried but by only the image pickup apparatus 1 functioning as a standalone apparatus is a process to store the taken image obtained as a result of an image pickup operation in the storage section 14 along with a post-conversion image, which is an image obtained as a result of the image conversion process.

A further example of the operation carried out by only the image pickup apparatus 1 functioning as a standalone apparatus is a process to convert an taken image read out by the storage section 14 from a portable recording medium such as an optical disk or a memory card into another image, provided that the storage section 14 has a reproduction unit for reproducing the image from the medium.

Figure 4B:
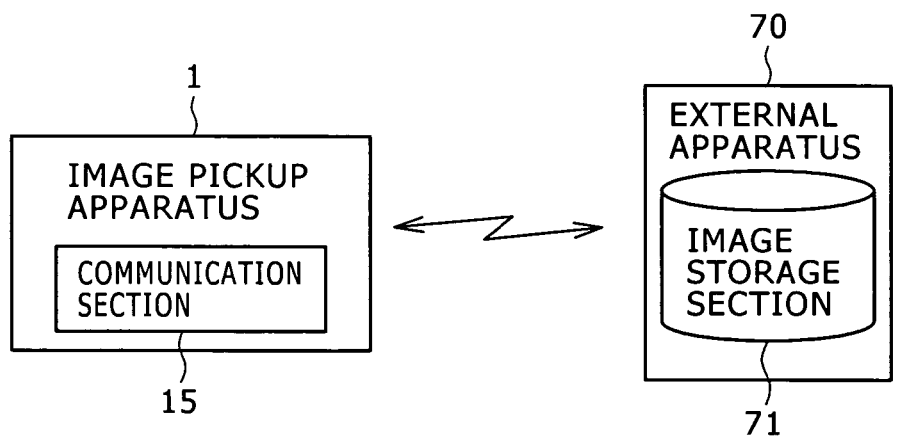
FIG. 4B is a diagram showing a typical communication between a communication section employed in an image pickup apparatus and an external apparatus.

FIG. 4B is a diagram showing a typical communication between the communication section 15 employed in the image pickup apparatus 1 and an external apparatus 70. In this case, in addition to the process to convert an taken image obtained as a result of an image pickup operation into another image as described above, it is assumed that the image pickup apparatus 1 also carries out a process to convert the image received by the communication section 15 from the external apparatus 70 into another image. Suppose that the external apparatus 70 is also an image pickup apparatus or that external apparatus 70 stores an image taken by another image pickup apparatus. In these cases, the external apparatus 70 may transmit the image to the image pickup apparatus 1. The communication section 15 employed in the image pickup apparatus 1 then receives the image transmitted by the external apparatus 70. Thus, the image pickup apparatus 1 may carry out a process to convert an image received by the communication section 15 from the external apparatus 70 into another image.

On top of that, in addition to storing a post-conversion image obtained as a result of an image pickup operation in the storage section 14 employed in the image pickup apparatus 1, the image pickup apparatus 1 may conceivably transmit the post-conversion image from the communication section 15 to the external apparatus 70 to be stored in an image storage section 71 employed in the external apparatus 70.

The communication between the image pickup apparatus 1 and the external apparatus 70 is by no means limited to the radio communication. That is to say, the communication between the image pickup apparatus 1 and the external apparatus 70 can also be a wire communication.

Figure 4C:
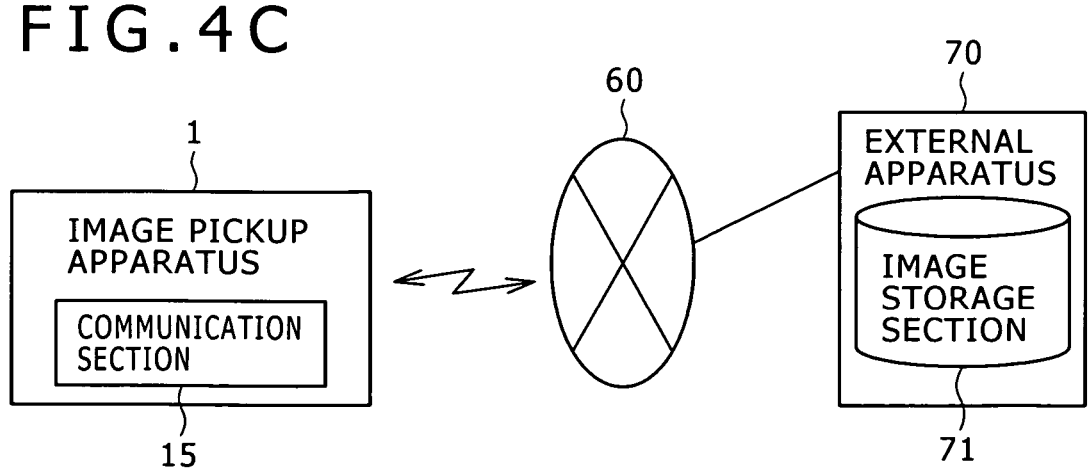
FIG. 4C is a diagram showing a typical communication between a communication section employed in an image pickup apparatus and an external apparatus through a network.

FIG. 4C is a diagram showing a typical communication between the communication section 15 employed in the image pickup apparatus 1 and an external apparatus 70 by way of a network 60 such as the Internet. In this case, the communication section 15 is required to specially have a communication access function for making an access to the network 60. Typically, a communication in this configuration is carried out in the same way as the communication shown in FIG. 4B.

In addition to the Internet, the network 60 can be any one of a variety of conceivable networks such as a hand-phone communication network, a PHS communication network, an ad-hoc network and a LAN to mentioned a few.

The external apparatus 70 shown in FIGS. 4B and 4C can be assumed to have the same configuration as the image pickup apparatus 1 shown in FIG. 2. As an alternative, the external apparatus 70 can also be assumed to be any one of a variety of apparatus such as a database server having a communication function, a personal computer, a video player, a video camera, a digital still camera, a hand phone having an imaging function and a PDA. In particular, the external apparatus 70 can be assumed to be a server of an image sharing system allowing a taken image to be shared by a variety of apparatus through a network.

3: Typical Image Processing

In this embodiment, the image analysis/conversion section 12 carries out processing to use the pixel area of a photographed-subject image as a to-be-processed area of an image conversion process. The photographed-subject image is a portion included in an image taken in a photographing as a photographed-subject image of a specific type. The image analysis/conversion section 12 then carries out the image conversion process to convert the photographed-subject image used as the to-be-processed area into another image.

In a manual image pickup operation, an example of the photographed-subject image of a specific type is an image of the face of a person. The image conversion process can be a mosaic generating process shown in FIG. 5 or 6.

FIG. 5A is an explanatory diagram showing a typical image taken by a user in a manual photographing as an image of the face of a particular person serving as the desired object of photographing. The taken image inadvertently includes the faces of persons irrelevant to the particular person in the background of the particular person.

In the case of an original taken image like the one described above for example, first of all, the image analysis/conversion section 12 uses the pixel area of the face of each irrelevant person as a to-be-processed area of the image conversion processing. The to-be-processed area is determined as follows. First of all, the original taken image is analyzed in order to determine the existence of an image of the face of a person in the original taken image as the existence of a photographed-subject image of a specific type and extract the image of the face of the person from the original taken image. Thus, the image of each face is extracted from the original taken image. In the case of the original taken image shown in FIG. 5A, the images of the faces of three persons are extracted from the original taken image. In the following description, the image of a face is also referred to as a face image. Then, the size of each of the extracted face images is computed. In this case, the size of an image extracted from the original taken image is the area of the extracted face image. In place of the area of a face image, the length of a diagonal line drawn across the face image can be taken as the size of the face image.

Then, the image analysis/conversion section 12 produces a result of determination as to whether the size of each face image is large or small. If the result of the determination indicates that the size of a face image is small, the pixel area of the face image is used as a to-be-processed area of the image conversion process. FIG. 5B is an explanatory diagram showing to-be-processed areas which are each the pixel area of a face image. As shown in the figure, the to-be-processed areas are the images of the faces of two persons each having a small face image size in the original taken image.

As described above, the size of each face image is examined in order to produce a result of determination as to whether the size of each face image is large or small. To put it concretely, the area of each face image or the length of a diagonal line drawn across the face image is compared with a threshold value determined in advance in order to produce a result of determination as to whether or not the area or the length is equal to or smaller than the threshold value. In this case, the area of a face image is the number of pixels existing in the image of the image. If the result of the determination indicates that the area or the length is equal to or smaller than the threshold value, the face image is regarded as a small face image and the pixel area of the face image is used as a to-be-processed area of the image conversion process.

As an alternative, instead of making use of a threshold value determined in advance for a comparison purpose, a face image having the largest area or the longest diagonal line among face images in the original taken image is used. To put it concretely, the area of a face image or the length of a diagonal line drawn across the face image is compared with the largest area or the longest diagonal line respectively. If the area of a face image or the length of a diagonal line drawn across the face image is sufficiently smaller than the largest area or the longest diagonal line respectively, the face image is regarded as a small face image and the pixel area of the face image is used as a to-be-processed area of the image conversion process. For example, if the area of a face image or the length of a diagonal line drawn across the face image is not greater than ½ times the largest area or the longest diagonal line respectively, the face image is regarded as a small face image and the pixel area of the face image is used as a to-be-processed area of the image conversion process.

If a face image regarded as a small face image in accordance with a determination result produced as described above exists in the original taken image, it is quite within the bounds of possibility that the face image is the image of the face of a person existing in the background of a person desired by the user as the object of photographing. The person existing in the background of the desired person is a person irrelevant to the desired person, and happened to be inadvertently photographed in the image pickup operation. In other words, it is quite within the bounds of possibility that an image of the face of the irrelevant person has been inadvertently included in the original taken image without consent of the person.

As described above, the pixel area of the face image regarded as a small face image in the original taken image in accordance with a determination result produced as described above is taken as a to-be-processed area ARi of an image conversion process which is typically a mosaic generating process. Then, the image analysis/conversion section 12 carries out the mosaic generating process on each to-be-processed area ARi determined in this way, generating a post-conversion image like one shown in FIG. 5C.

FIG. 6A is a diagram showing a typical image taken by the user in an automatic photographing carried out by making use of the image pickup apparatus 1 as an image of an object of photographing. That is to say, the typical image is typically an image taken periodically by making use of the image pickup apparatus 1 shown in FIG. 1A or 1B with a timing which the user is not aware of. With the image pickup apparatus 1 used periodically in this way, a person irrelevant to the desired object of photographing and the user pass each other in many cases. In such cases, an image of the face of the person is inadvertently included in the taken image.

In the case of an original taken image like the one described above for example, first of all, the image analysis/conversion section 12 uses the pixel area of the face of each irrelevant person as a to-be-processed area ARi of the image conversion processing. The to-be-processed area ARi is determined as follows. First of all, the original taken image is analyzed in order to determine the existence of an image of a person face in the original taken image as the existence of a photographed-subject image of a specific type and extract the image of the face of the person from the original taken image. Thus, the image of each face is extracted from the original taken image. In the case of the original taken image shown in FIG. 6A, the images of the faces of three persons are extracted from the original taken image. Then, the size of each of the extracted face images is computed. In this case, the size of an image extracted from the original taken image is the area of the extracted face image. In place of the area a face image, the length of a diagonal line drawn across the face image can be taken as the size of the face image.

Then, the image analysis/conversion section 12 produces a result of determination as to whether the size of each face image is large or small. If the result of the determination indicates that the size of a face image is large, the pixel area of the face image is used as a to-be-processed area ARi of the image conversion process. FIG. 6B is a diagram showing a to-be-processed area ARi which is the pixel area of a face image. As shown in the figure, the to-be-processed area ARi is the image of the face of one person having a large face image size in the original taken image.

As described above, the size of each face image is examined in order to produce a result of determination as to whether the size of each face image is large or small. To put it concretely, the area of each face image or the length of a diagonal line drawn across the face image is compared with a threshold value determined in advance in order to produce a result of determination as to whether or not the area or the length is equal to or greater than the threshold value. In this case, the area of a face image is the number of pixels existing in the image of the image. If the result of the determination indicates that the area or the length is equal to or greater than the threshold value, the face image is regarded as a large face image and the pixel area of the face image is used as a to-be-processed area ARi of the image conversion process.

As an alternative, instead of making use of a threshold value determined in advance for a comparison purpose, the size of the entire original taken image or the length of a diagonal line drawn across the entire original taken image is used. To put it concretely, the area of a face image or the length of a diagonal line drawn across the face image is compared with the area of the entire image or the length of a diagonal line drawn across the entire original taken image respectively. If the area of a face image or the length of a diagonal line drawn across the face image is sufficiently large in comparison with the area of the entire image or the length of a diagonal line drawn across the entire original taken image respectively, the face image is regarded as a large face image and the pixel area of the face image is used as a to-be-processed area ARi of the image conversion process. For example, if the area of a face image or the length of a diagonal line drawn across the face image is at least equal to ⅙ times the area of the entire image or the length of a diagonal line drawn across the entire original taken image respectively, the face image is regarded as a large face image and the pixel area of the face image is used as a to-be-processed area ARi of the image conversion process.

If a face image regarded as a large face image in accordance with a determination result produced as described above exists in the original taken image, it is quite within the bounds of possibility that the face image is the image of the face of a person not desired by the user as the object of photographing. The undesired person is a person irrelevant to the desired object of photographing, and happened to be inadvertently photographed in the automatic photographing. In other words, it is quite within the bounds of possibility that an image of the face of the irrelevant person has been inadvertently included in the original taken image without consent of the person. Since the image of the face of the irrelevant person is large, the person can be identified as an individual with ease and, if this original taken image is disclosed to the public, it is quite within the bounds of possibility that an image-right problem is raised.

In this case, the pixel area of the face image regarded as a large face image in the original taken image in accordance with a determination result produced as described above is taken as a to-be-processed area ARi of an image conversion process which is typically a mosaic generating process. Then, the image analysis/conversion section 12 carries out the mosaic generating process on each to-be-processed area ARi determined in this way, generating a post-conversion image like one shown in FIG. 6C.

In the case of the typical original taken images shown in FIGS. 5 and 6, a mosaic generating process is carried out on each to-be-processed area ARi as the image conversion process. It is to be noted, however, that the image conversion process is by no means limited to the mosaic generating process. That is to say, there are various kinds of image conversion processing.

As the image conversion process according to the embodiment, the image analysis/conversion section 12 caries out processing to convert a specific-type photographed-subject image with the pixel area thereof used as the to-be-processed area into an image which cannot be recognized or is difficult to recognize. An example of the photographed-subject image is an image of the face of a person. As an alternative to such an image conversion process, the image analysis/conversion section 12 caries out processing to replace the photographed-subject image with the pixel image thereof used as the to-be-processed area ARi with another image. In either case, the actual photographed-subject image of a specific type is hidden as a result of the processing.

The processing to convert a specific-type photographed-subject image with the pixel area thereof used as the to-be-processed area into an image which cannot be recognized or is difficult to recognize can be a process other than the mosaic generation process. Examples of the process other than the mosaic generation process are a soft focus process and an image encryption process which is also referred to as a scrambling process. The soft focus process is a process to convert a specific-type photographed-subject image with the pixel area thereof used as the to-be-processed area into a blurring image which is a defocused image. The image encryption process is a process to make the photographed-subject image invisible. Another conceivable example of the process other than the mosaic generation process is a process carried out to conceal eyes of a face shown in a face image of a person by adding black lines to the eye portions of the face image. In this way, the person shown in the original taken image is made an unidentifiable individual.

In addition, in typical processing to replace a photographed-subject image in a to-be-processed area with another image, an image of a face or an image of a copyrighted work is replaced with an animation image or any one of a variety of images.

4: Processing of the Image Analysis/Conversion Section

In accordance with a command issued by the system controller 10, the image analysis/conversion section 12 carries out processing to generate a post-conversion image from a taken image specified by the command as an image to be processed. The following description explains typical processing carried out by the image analysis/conversion section 12 to extract a face image included in an input taken image, use the extracted face image as a to-be-processed area ARi and carry out a predetermined process on the area ARi to generate a post-conversion image. As described earlier, the technical term 'to-be-processed area ARi' is defined as an area to be processed in the predetermined process.

Figure 7:
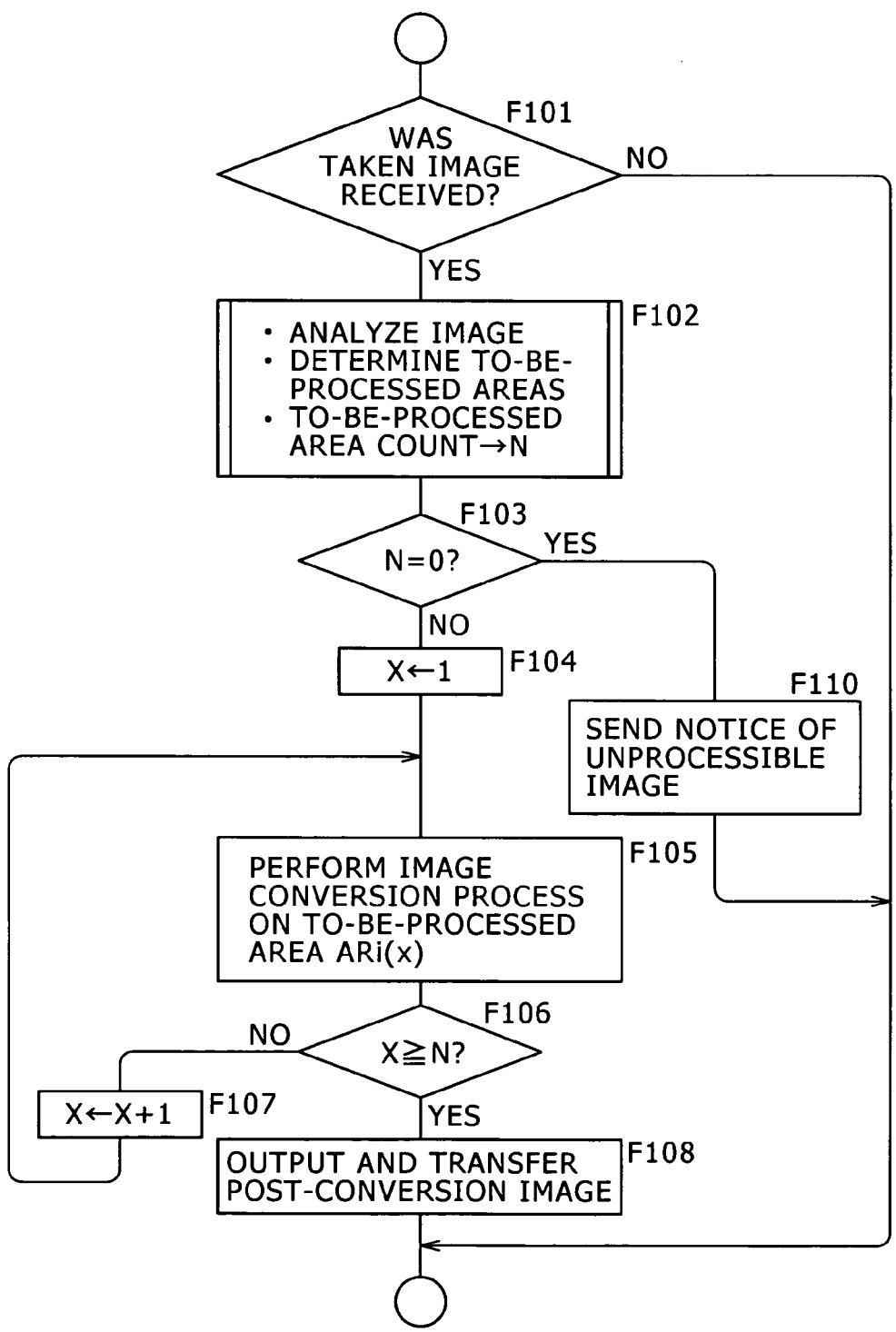
FIG. 7 shows a flowchart representing processing carried out by an image analysis/conversion section in accordance with an embodiment.

FIG. 7 shows a flowchart representing the typical processing carried out by the image analysis/conversion section 12 in accordance with a command received from the system controller 10.

The system controller 10 executes control to transfer a taken image to be processed to the image analysis/conversion section 12 and send a command to the image analysis/conversion section 12 to process the image in accordance with the flowchart shown in FIG. 7. Typically, the taken image transferred to the image analysis/conversion section 12 is an image taken by the imaging section 3 in a photographing. As an alternative, the taken image transferred to the image analysis/conversion section 12 is a taken image received by the communication section 15 from an external apparatus or a taken image read out by the storage section 14 from an image recording medium.

Receiving a taken image to be processed, the image analysis/conversion section 12 continues the processing represented by the flowchart shown in FIG. 7 from a step F101 to a step F102.

At the step F102, the image analysis/conversion section 12 analyzes the taken image in order to determine a plurality of to-be-processed areas ARi in the taken image. The number of to-be-processed areas ARi is stored in a variable N.

Figure 8:
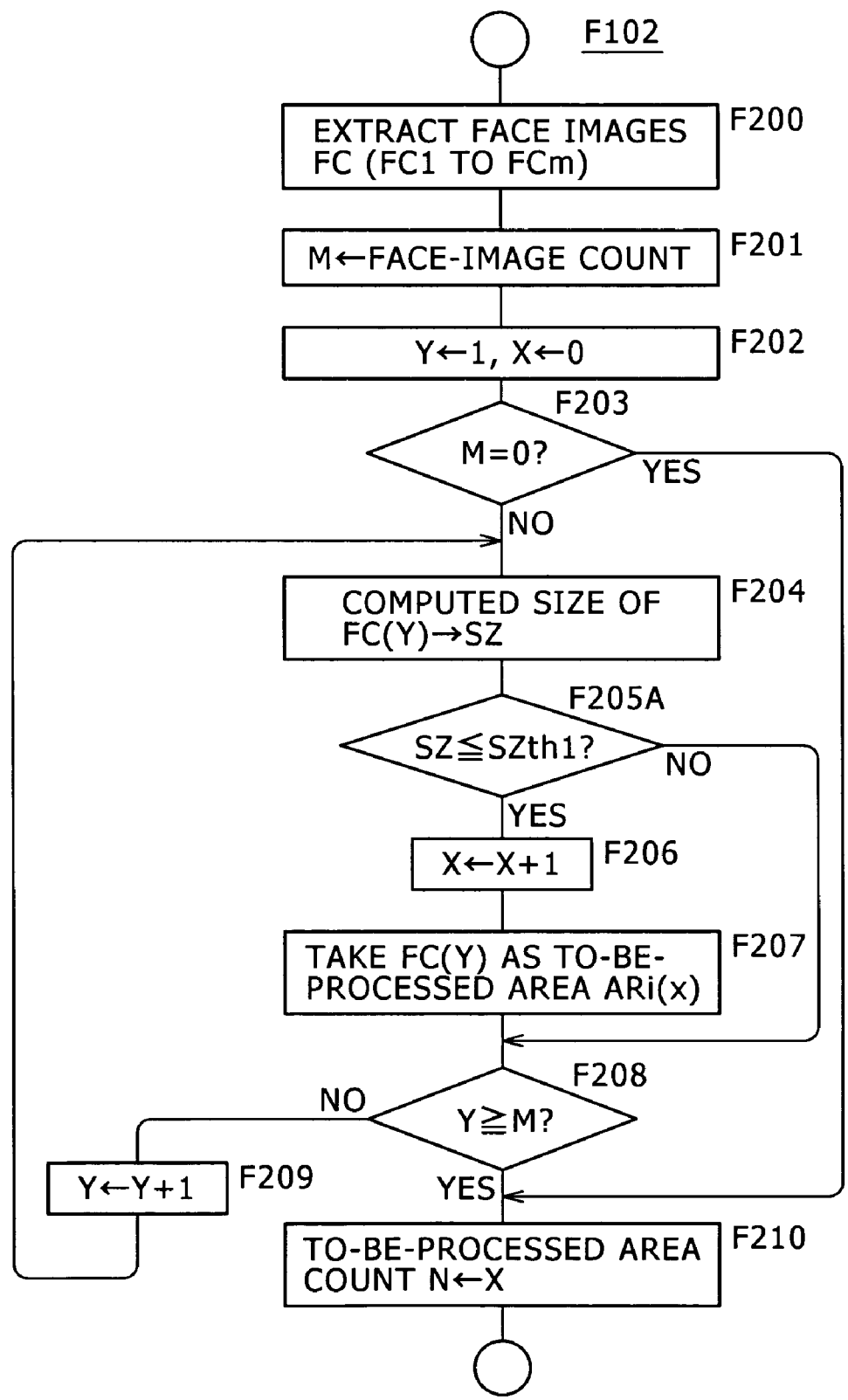
FIG. 8 shows a flowchart representing processing carried out to determine to-be-processed areas in accordance with an embodiment at a step in the processing represented by the flowchart shown in FIG. 7.
Figure 9:
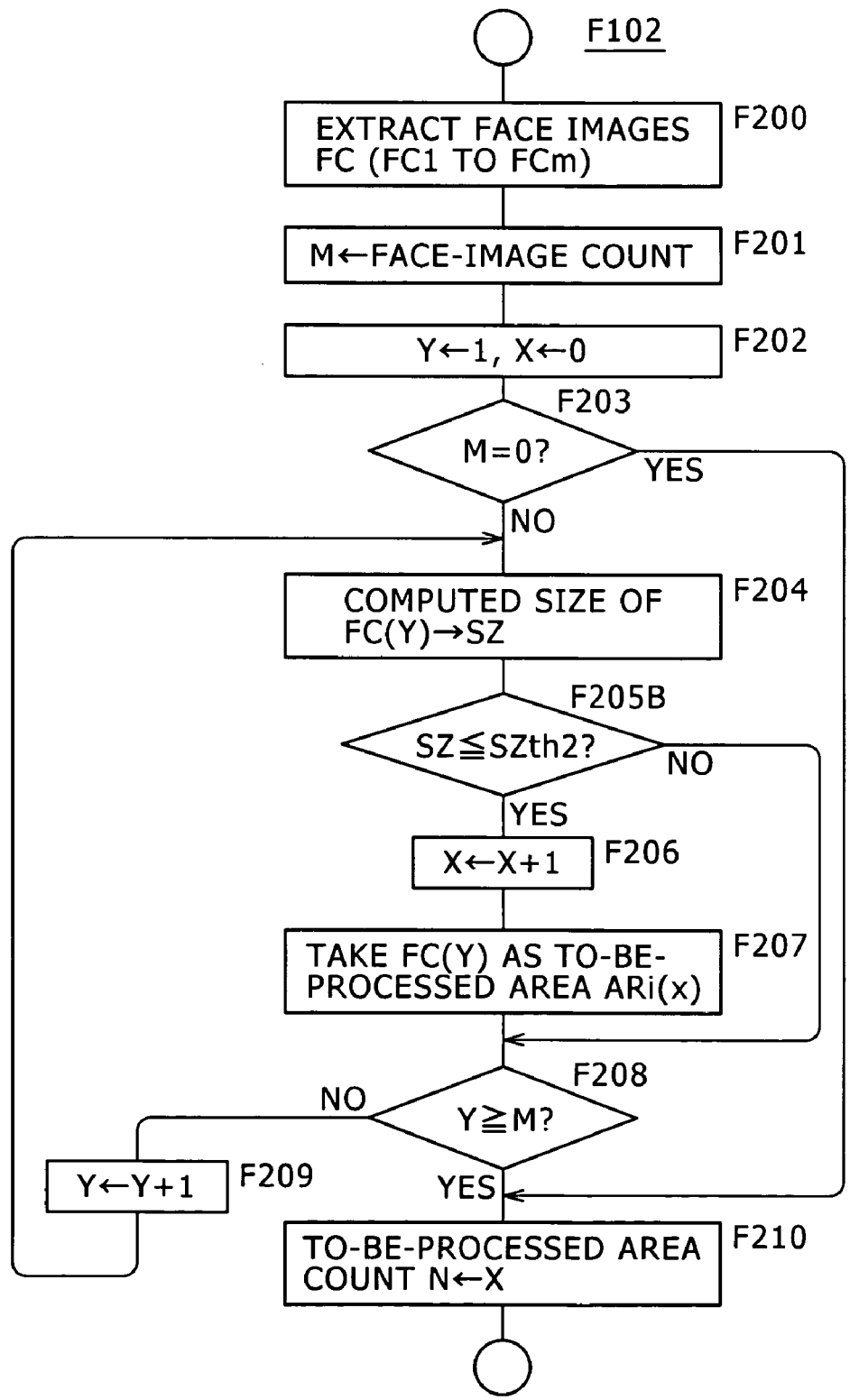
FIG. 9 shows a flowchart representing other processing carried out to determine to-be-processed areas in accordance with an embodiment at a step in the processing represented by the flowchart shown in FIG. 7.
Figure 10:
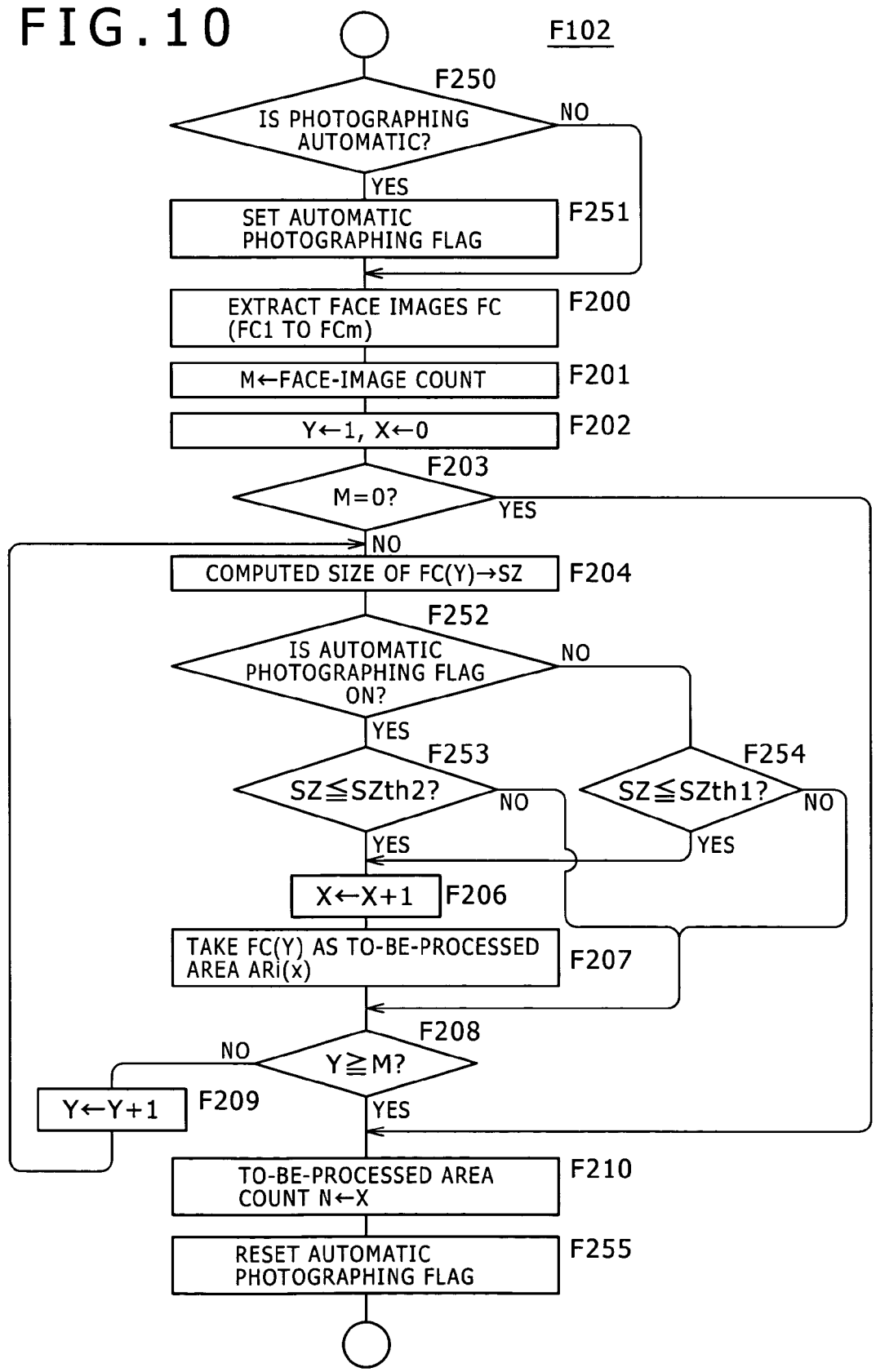
FIG. 10 shows a flowchart representing further processing carried out to determine to-be-processed areas in accordance with an embodiment at a step in the processing represented by the flowchart shown in FIG. 7.

The process carried out at the step F102 are implemented as typical processing according to a flowchart shown in FIG. 8, 9 or 10.

The flowchart shown in FIG. 8 represents typical processing proper for the image pickup apparatus 1 for carrying out manual image pickup operations.

The processing carried out by the image analysis/conversion section 12 at the step F102 included in the flowchart shown in FIG. 7 is represented by the flowchart shown in FIG. 8 as a flowchart beginning with a step F200. At the step F200, the image analysis/conversion section 12 analyzes the taken image in order to extract a face image FC or a plurality of face images FC1 to FCm from the taken image. Then, at the next step F201, the image analysis/conversion section 12 stores a face-image count m representing the number of face images extracted from the taken image in a variable M. Subsequently, at the next step F202, the image analysis/conversion section 12 sets a variable Y at 1 and a variable X at 0. The variable Y is a variable used for controlling execution of a loop in the processing represented by this flowchart. On the other hand, the variable X represents the number of face images each having a size SZ not exceeding a threshold value SZth1. Then, at the next step F203, the image analysis/conversion section 12 produces a result of determination as to whether or not the variable M is equal to 0 (that is, M=0?). A determination result indicating that the variable M is equal to 0 means that no face images FC have been extracted from the taken image, that is, no face images FC have been detected in the taken image. In this case, the flow of the processing represented by this flowchart goes on to a step F210 at which the value of the variable X is set in the variable N representing the number of to-be-processed areas ARi. Since the value of the variable X is 0 in this case, the variable N is set at 0 (N=0).

On the other hand, a determination result indicating that the variable M is equal to or greater than 1 means that one or more face images FC have been extracted from the taken image. In this case, the flow of the processing represented by this flowchart goes on to steps F204 to F207 at which the image analysis/conversion section 12 carries out processing determined in advance on each of the face images FC while incrementing the variable Y by 1 at a step F209 for each loop consisting of the steps.

First of all, at the step F204, the image analysis/conversion section 12 computes the size of a face image FC (Y) and stores the size in a variable SZ. Initially, the value of Y is 1 (Y=1). Thus, the image analysis/conversion section 12 computes the size of the first extracted face image FC (1) or FC1. As described before, the size of a face image is defined as the area of the face image or the length of a diagonal line drawn across the face image. The area of a face image can be interpreted as the number of pixels included in the face image.

Then, at the next step F205A, the image analysis/conversion section 12 compares the computed size SZ of the face image FC (Y) with the threshold value SZth1 (that is, SZ≦SZth1?) in order to produce a result of determination as to whether the face image FC (Y) is a face image having a small or large size. If the result of the determination indicates that the computed size SZ of the face image FC (Y) is equal to or smaller than the threshold value SZth1 (that is, SZ≦SZth1), that is, the face image FC (Y) is a face image having a small size, the pixel area of the face image FC (Y) is determined to be an area to be designated as a to-be-processed area ARi. In this case, the flow of the processing represented by this flowchart goes on to a step F206 at which the image analysis/conversion section 12 increments the variable X by 1. Then, at the next step F207, the pixel area of the face image FC (Y) is designated as a to-be-processed area ARi (X).

If the determination result produced in the process carried out at the step F205A indicates that the computed size SZ of the face image FC (Y) is greater than the threshold value SZth1 (that is, SZ>SZth1), that is, the face image FC (Y) is a face image having a large size, on the other hand, the processes of the steps F206 and F207 are not carried out. That is to say, the pixel area of the face image FC (Y) is not designated as a to-be-processed area ARi.

In this case, the flow of the processing represented by this flowchart goes on to a step F208 at which the image analysis/conversion section 12 compares the variable Y indicating a face image FC to be processed next with the variable M representing the number of face images FC extracted in the process carried out at the step F201 as face images FC to be processed. The image analysis/conversion section 12 compares the variable Y with the variable M (M≦Y?) in order to produce a result of determination as to whether or not it is time to end the processing to designate each of the face images FC extracted in the process carried out at the step F201 as a to-be-processed area ARi. If the result of the determination indicates that the variable Y is smaller than the variable M (Y<M), that is, there are at least one still face image FC remaining to be processed, the flow of the processing represented by this flowchart goes on to a step F209 at which the image analysis/conversion section 12 increments the variable Y by 1. Then, the flow of the processing represented by this flowchart goes back to the step F204. For example, if the image analysis/conversion section 12 has incremented the variable Y to 2 in the process carried out at the step F209, this time, at the steps F204 to F208, the face image FC (2) or FC2 is subjected to the same processes as the face image FC1.

At the end of the processing carried out at the steps F204 to F208 to designate each of the face images FC extracted in the process carried out at the step F201 as a to-be-processed area ARi, the determination result produced in the process carried out at the step F208 indicates that the variable Y is equal to the variable M (that is, Y=M). In this case, the flow of the processing represented by this flowchart goes on to a step F210. At the step F210, the value of the variable X is set in the variable N representing the number of to-be-processed areas ARi. This is because the variable X represents the number of face images FC each designated as a to-be-processed area ARi in the process carried out at the step F207.

By carrying out the processing represented by the flowchart shown in FIG. 8, each face image FC having a small size is designated as a to-be-processed area ARi as shown in FIG. 5B.

On the other hand, the flowchart shown in FIG. 9 represents typical processing proper for the image pickup apparatus 1 for carrying out automatic image pickup operations. The process carried out by the image analysis/conversion section 12 at the step F102 included in the flowchart shown in FIG. 7 is represented by the flowchart shown in FIG. 9 as a flowchart beginning with a step F200. It is to be noted that steps F200 to F204 and F206 to F210 included in the flowchart shown in FIG. 9 are identical with respectively the counterpart steps F200 to F204 and F206 to F210 included in the flowchart shown in FIG. 8. The only difference between the two flowcharts is a difference between a step F205B included in the flowchart shown in FIG. 9 and the step F205A included in the flowchart shown in FIG. 8.

That is to say, at the step F205B, the image analysis/conversion section 12 compares the computed size SZ of the face image FC (Y) with the threshold value SZth2 (that is, SZ≧SZth2?) in order to produce a result of determination as to whether the face image FC (Y) is a face image having a small or large size. If the result of the determination indicates that the computed size SZ of the face image FC (Y) is equal to or greater than the threshold value SZth2 (that is, SZ≧SZth2), that is, the face image FC (Y) is a face image having a large size, the pixel area of the face image FC (Y) is determined to be an area to be designated as a to-be-processed area ARi. In this case, the flow of the processing represented by this flowchart goes on to a step F206 at which the image analysis/conversion section 12 increments the variable X by 1. Then, at the next step F207, the pixel area of the face image FC (Y) is designated as a to-be-processed area ARi (X).

If the determination result produced in the process carried out at the step F205B indicates that the computed size SZ of the face image FC (Y) is smaller than the threshold value SZth2 (that is, SZ<SZth1), that is, the face image FC (Y) is a face image having a small size, on the other hand, the processes of the steps F206 and F207 are not carried out. That is to say, the pixel area of the face image FC (Y) is not designated as a to-be-processed area ARi.

By carrying out the processing represented by the flowchart shown in FIG. 9, each face image FC having a large size is designated as a to-be-processed area ARi as shown in FIG. 6B.

The flowchart shown in FIG. 10 represents typical processing proper for the image pickup apparatus 1 for carrying out both manual and automatic image pickup operations.

The process carried out by the image analysis/conversion section 12 at the step F102 included in the flowchart shown in FIG. 7 is represented by the flowchart shown in FIG. 10 as a flowchart beginning with a step F250. It is to be noted that steps F200 to F204 and F206 to F210 included in the flowchart shown in FIG. 10 are identical with respectively the counterpart steps F200 to F204 and F206 to F210 included in the flowchart shown in FIG. 8.

At the step F250, the image analysis/conversion section 12 produces a result of determination as to whether the taken image supplied to the image analysis/conversion section 12 as an image to be processed is an image taken as a result of a manual or automatic photographing. For example, in the case of a taken image received by the image analysis/conversion section 12 from the imaging control section 6 as an image obtained as a result of a photographing, the system controller 10 notifies the image analysis/conversion section 12 that the taken image is an image taken as a result of a manual or automatic photographing.

In the case of a taken image received by the image analysis/conversion section 12 from the storage section 14 as an image obtained as a result of an operation to reproduce an image, the image analysis/conversion section 12 examines image management information for the taken image in order to produce a result of determination as to whether the taken image is an image taken as a result of a manual or automatic photographing.

In the case of a taken image received by the image analysis/conversion section 12 from the communication section 15 as an image originated from an external apparatus along with image management information, the image analysis/conversion section 12 examines the image management information in order to produce a result of determination as to whether the taken image is an image taken as a result of a manual or automatic photographing.

If the determination result produced in the process carried out by the image analysis/conversion section 12 at the step F250 indicates that the taken image is an image taken as a result of an automatic photographing, the flow of the processing represented by this flowchart goes on to a step F251 at which the image analysis/conversion section 12 sets an automatic photographing flag.

Then, at the next step F200, the image analysis/conversion section 12 carries out a process to extract face images FC from the taken image and, at the next step F201, the image analysis/conversion section 12 initializes the variable M. Subsequently, at the next step F202, the image analysis/conversion section 12 initializes the variables Y and X.

At the step F204 of this flowchart representing the typical processing, the image analysis/conversion section 12 computes the size of a face image FC (Y) before continuing the processing to a step F252 at which the image analysis/conversion section 12 produces a result of determination as to whether the automatic photographing flag is in an on or off state.

If the result of the determination indicates that the automatic photographing flag is in an off state showing that the taken image being processed is an image obtained as a result of a manual photographing, the flow of the processing represented by this flowchart goes on to a step F254 at which the image analysis/conversion section 12 compares the computed size SZ of the face image FC (Y) with the threshold value SZth1 (that is, $SZ \leq SZth1$?) in order to produce a result of determination as to whether or not the face image FC (Y) is a face image having a small size. If the result of the determination indicates that the automatic photographing flag is in an on state showing that the taken image being processed is an image obtained as a result of an automatic photographing, on the other hand, the flow of the processing represented by this flowchart goes on to a step F253 at which the image analysis/conversion section 12 compares the computed size SZ of the face image FC (Y) with the threshold value SZth2 (that is, $SZ \geq SZth2$?) in order to produce a result of determination as to whether or not the face image FC (Y) is a face image having a large size.

If the determination result produced in the process carried out at the step F254 indicates that the computed size SZ of the face image FC (Y) is equal to or smaller than the threshold value SZth1 (that is, $SZ \leq SZth1$), the flow of the processing represented by this flowchart goes on to steps F206 and F207 at which the image analysis/conversion section 12 designates the pixel area of the face image FC (Y) as a to-be-processed area ARi.

By the same token, if the determination result produced in the process carried out at the step F253 indicates that the computed size SZ of the face image FC (Y) is equal to or greater than the threshold value SZth2 (that is, $SZ \geq SZth2$), the flow of the processing represented by this flowchart goes on to the steps F206 and F207 at which the image analysis/conversion section 12 designates the pixel area of the face image (Y) as a to-be-processed area ARi.

That is to say, by carrying out the processing represented by the flowchart shown in FIG. 10, each face image FC included in a taken image resulting from a manual photographing as a face image FC having a small size is designated as a to-be-processed area ARi as shown in FIG. 5B. On the other hand, each face image FC included in a taken image resulting from an automatic photographing as a face image FC having a large size is designated as a to-be-processed area ARi as shown in FIG. 6B.

It is to be noted that, after the processing carried out on all the extracted face images FC has been completed, the processing represented by the flowchart shown in FIG. 10 goes on to a step F210 at which the variable X is set in the variable N representing the number of to-be-processed areas ARi. Then, at the next step F255, the automatic photographing flag is turned off.

As described above, the flowchart shown in FIG. 8, 9 or 10 represents details of the process carried out by the image analysis/conversion section 12 at the step F102 included in the flowchart shown in FIG. 7. Thus, after the image analysis/conversion section 12 determines one to-be-processed area ARi or a plurality of to-be-processed areas ARi in the process carried out at the step F102 included in the flowchart shown in FIG. 7, the image analysis/conversion section 12 continues the processing to a step F103 of the same flowchart.

At the step F103, the image analysis/conversion section 12 produces a result of determination as to whether or not the variable N representing the number of to-be-processed areas ARi is equal to 0 (that is, N=0?). As described earlier, the variable N subjected to the process of determination as to N=0? has been set at the step F210 included in the flowchart shown in FIG. 8, 9 or 10. A variable N set at 0 (or N=0) indicates that no to-be-processed areas ARi were determined in the original taken image. The variable N is set at 0 if no face image is detected in the original taken image, that is, if no face image is extracted from the original taken image. The variable N is also set at 0 if a face image FC having a small size does not exist in the original taken image processed in the processing represented by the flowchart shown in FIG. 8 or 10 as an original taken image obtained as a result of a manual photographing. By the same token, the variable N is also set at 0 if a face image FC having a large size does not exist in the original taken image processed in the processing represented by the flowchart shown in FIG. 9 or 10 as an original taken image obtained as a result of an automatic photographing.

In either case, a variable N set at 0 (or N=0) indicates that no to-be-processed areas ARi were determined in the original taken image. In this case, the flow of the processing represented by the flowchart shown in FIG. 7 goes on to a step F110 at which the image analysis/conversion section 12 notifies the system controller 10 that a post-conversion image cannot be generated from the currently processed taken image.

If one or more to-be-processed areas ARi have been determined, the image analysis/conversion section 12 continues the processing represented by this flowchart to a step F104 at which the variable X is set at 1 (X=1).

Then, at the next step F105, the image analysis/conversion section 12 carries out an image conversion process on the to-be-processed area ARi (X) indicated by the variable X in order to generate a post-conversion image.

The image conversion process can be a mosaic generating process, a soft focusing process, an image encryption process (also referred to as an image scrambling process) or a process to replace a photographed-subject image having the pixel area thereof used as the to-be-processed area ARi (X) with an animation image or any of a variety of other images. If the image analysis/conversion section 12 carries out the process to replace a photographed-subject image having the pixel area thereof used as the to-be-processed area ARi (X) with an animation image or any of a variety of other images, the image analysis/conversion section 12 reads out the replacement image from the memory 12a and uses the image read out from the memory 12a as a replacement for the partial image.

After the photographed-subject image having the pixel area thereof used as the to-be-processed area ARi (X) is replaced with a replacement image in the process carried out at the step F105 in order to generate a post-conversion image, the flow of the processing represented by this flowchart goes on to a step F106 at which the image analysis/conversion section 12 compares the variable X with the variable N representing the number of to-be-processed areas ARi (X≧N?) in order to produce a result of determination as to whether or not the processing to process all the to-be-processed areas ARi in the taken image have been completed.

If the result of the determination indicates that to-be-processed areas ARi still remain to be processed in the taken image (that is, if X<N), the flow of the processing represented by this flowchart goes on to a step F107 at which the image analysis/conversion section 12 increments the variable X by 1. Then, the flow of the processing represented by this flowchart goes back to the step F105 in order to process the next to-be-processed ARi (X) in the same way as the previous to-be-processed ARi (X−1).

If the result of the determination indicates that no more to-be-processed areas ARi still remain to be processed in the taken image (that is, if X=N), on the other hand, the flow of the processing represented by this flowchart goes on to a step F108. At this point of time, each photographed-subject image having the pixel area thereof used as a to-be-processed area ARi has been subjected to an image conversion process to generate a post-conversion image like the one shown in FIG. 5C or 6C. Thus, at the step F108, in accordance with a command issued by the system controller 10, the image analysis/conversion section 12 outputs the post-conversion image generated as described above.

Typically, the image analysis/conversion section 12 outputs the post-conversion image to the display control section 7 which then displays the image on the display section 2. As another example, the image analysis/conversion section 12 outputs the post-conversion image to the communication section 15 which then transmits the image to an external apparatus 70. As a further example, the image analysis/conversion section 12 outputs the post-conversion image to the storage section 14 which then stores the image in a memory in a data structure like the one shown in FIG. 3. As an alternative, the storage section 14 stores the post-conversion image in a portable recording medium. In this case, however, the storage section 14 is required to have a recording/reproduction unit for recording the post-conversion image onto the portable recording medium.

As described above, the image analysis/conversion section 12 carries out a process to determine to-be-processed areas ARi and an image conversion process to convert each photographed-subject image having the pixel area thereof used a to-be-processed area ARi into another image in order to generate a post-conversion image.

It is to be noted that, if the taken image is a standstill image, only an image of one frame needs to be subjected to the process to determine to-be-processed areas ARi and the image conversion process. In the case of a moving image, on the other hand, each of frames composing the moving image needs to be subjected to the process to determine to-be-processed areas ARi and the image conversion process.

5: Processing According to Human Attributes/Facial Expressions

By the way, instead of carrying out the mosaic generating processing or the other processing as the image conversion process of the step F105, it can be assumed that a process is performed to replace each photographed-subject image such as a face image with the pixel area thereof used as a to-be-processed area ARi with another image. In this case, it is conceivable to provide an image replacement process to analyze human attributes and/or facial expression of a face shown in the face image and replace the face image with an animation image according to the result of the analysis.

The human attributes of a person include the gender and age of the person. In the following description, a human attribute is referred to as merely an attribute. It is known that a process can be carried out to analyze attributes and/or facial expression of a face shown in the face image as the face of a person in order to recognize the gender of the person and estimate the age bracket of the person correctly to a certain degree of probability. In addition, the result of an analysis carried out on the image of a face can also be used to estimate the facial expression of the face.

There are a variety of conceivable processes for determining the facial expression of a face. For example, in accordance with a technique adopted in a typical facial-expression determination process, parts composing a face are extracted and an evaluation value is given to each of the extracted parts. Then, the sum of the evaluation values is used for determining the facial expression of the face.

In a process to recognize a laughing face for example, parts extracted from the face image of the face include the eyes, eyebrows and lips. Then, an angle form by each of the eyebrows is estimated. The so-called lifted state of an eyebrow is given a low evaluation point. That is to say, the lower the position of both the ends of an eyebrow, the higher the evaluation point given to the eyebrow. As for an eye, the opening state of the pupil is examined. The wider the opening state of the pupil, the higher the evaluation point given to the eye. In addition, the lower the positions to which both the edges of the lips are pulled down, the lower the evaluation point given to the lips. On the other hand, the higher the positions to which both the edges of the lips are raised, the higher the evaluation point given to the lips.

An evaluation point for determining a laughing state of a face is given to each part extracted from the face and a sum of the evaluation points given to all the extracted parts is then found. If necessary, a weighted sum of the evaluation points is found by multiplying each evaluation point by a weight determined in advance for the evaluation point. The sum or the weighted sum is then used as a laughing-face point for determining a laughing state of the face. That is to say, a high laughing-face point indicates that the face is in a laughing state.

It is needless to say that the above technique for determining a laughing state of the face is no more than a typical technique. For example, wrinkles developed on a face can also be used as an element for determining a laughing state of the face.

On top of that, in addition to the determination of a laughing state, it is also possible to produce a result of determination as to whether or not a facial expression expresses an irritation, whether or not a facial expression expresses a displeasure or whether or not a facial expression expresses another feeling by evaluating the image of each part extracted from a face displaying the facial expression.

As described above, the attributes and/or facial expression of a face image with the pixel area thereof used as a to-be-processed area ARi are recognized by analyzing the face image and an animation image to be used as an image for replacing the face image is selected in accordance with the recognized attributes and/or the recognized facial expression. Then, conceivably, the animation image is used as a substitute for the face image.

Figure 11:
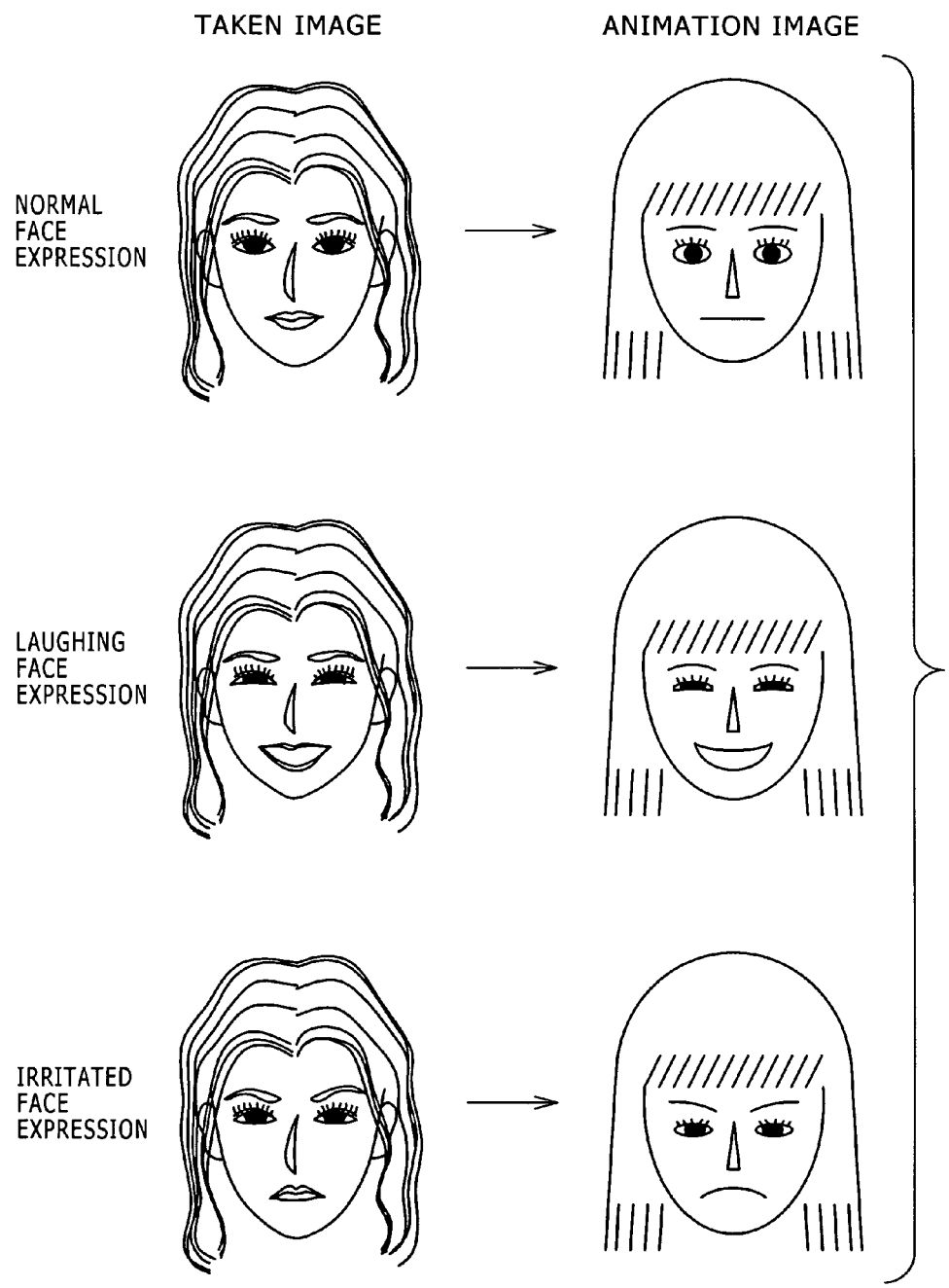
FIG. 11 is a variety of diagrams showing a typical process to select animation images each used as a substitute for a face image of a female adult in accordance with the attributes and facial expression of the face image.
Figure 12:
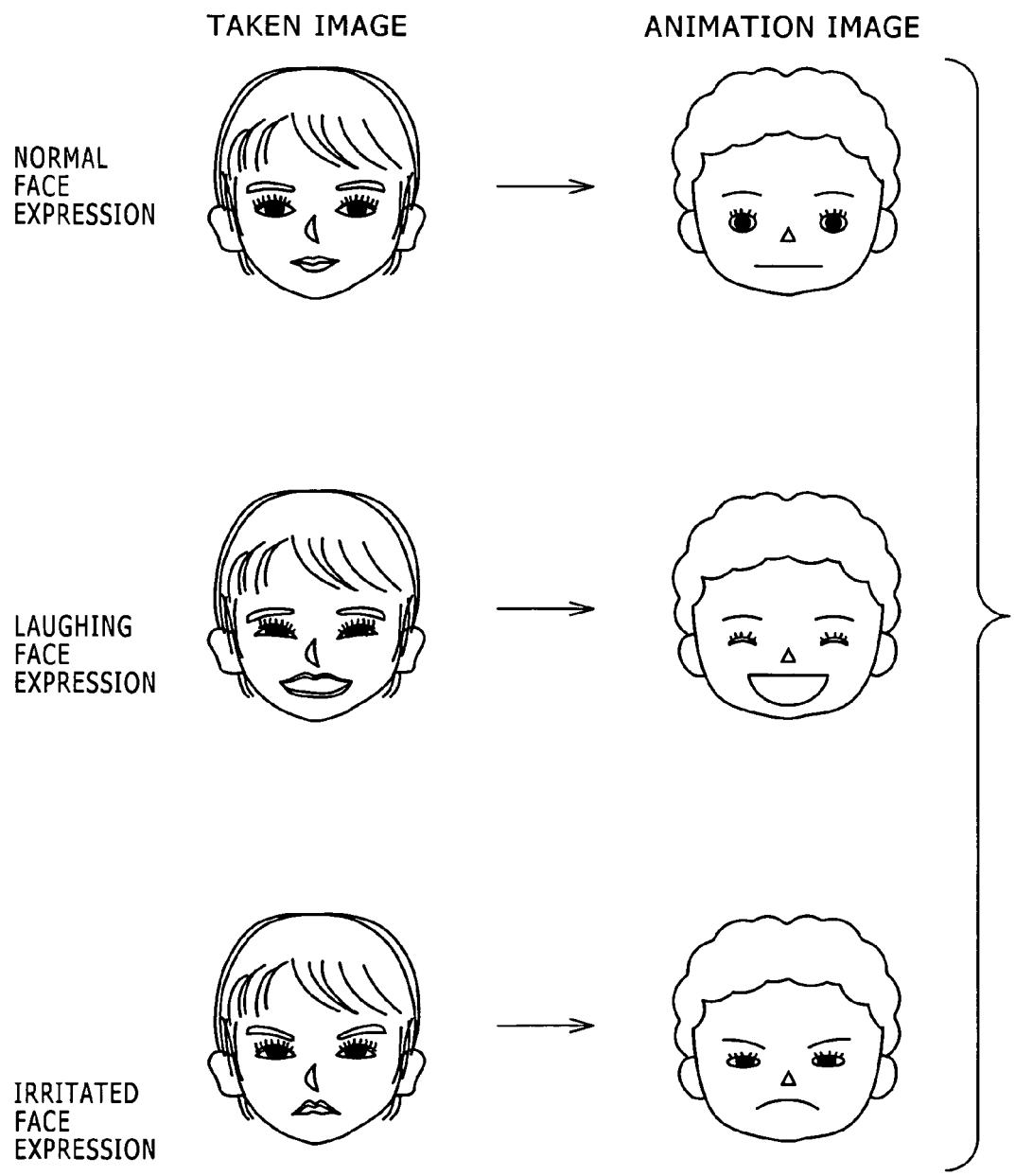
FIG. 12 is a variety of diagrams showing a typical process to select animation images each used as a substitute for a face image of a male child in accordance with the attributes and facial expression of the face image.

FIGS. 11 and 12 are each a variety of diagrams showing a typical process to select animation images each used as a substitute for an image of a face in accordance with the facial expression of the image of the face.

The left side of FIG. 11 shows three face images each obtained as a result of an operation to photograph a female adult. The three face images display a normal facial expression, a laughing facial expression and an irritated facial expression respectively.

On the other hand, the right side of the same figure shows animation images prepared as substitutes for their respective face images shown on the left side. The animation images are three images of the face of a female adult also displaying a normal facial expression, a laughing facial expression and an irritated facial expression respectively.

In addition, the left side of FIG. 12 shows three taken face images each obtained as a result of an operation to photograph a male child. The three face images display a normal facial expression, a laughing facial expression and an irritated facial expression respectively.

On the other hand, the right side of the same figure shows animation images prepared as substitutes for their respective face images shown on the left side. The animation images are three images of the face of a male child displaying a normal facial expression, a laughing facial expression and an irritated facial expression respectively.

By the same token, a variety of animation images usable as substitutes for images of faces of adult males and child females are also prepared. However, these animations are shown in none of the figures.

If a laughing face of a female adult has been recognized as a result of analyzing a face image with the pixel area thereof used as a to-be-processed area ARi for example, the animation image shown in the middle of the right side of FIG. 11 as an animation image prepared for a laughing face of a female adult is selected and the actual face image is replaced with the selected animation image.

Figure 13:
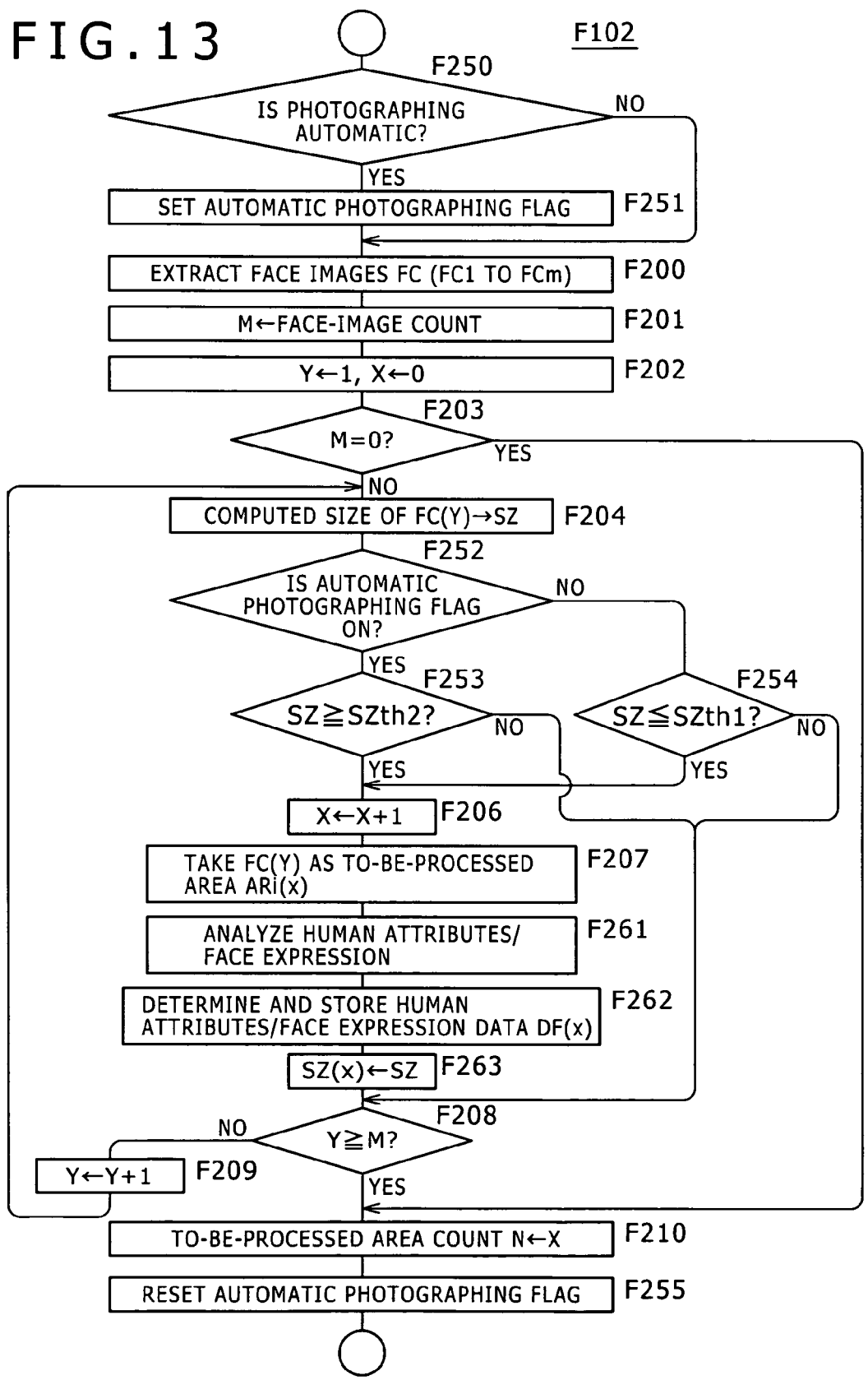
FIG. 13 shows a flowchart representing still further processing carried out to determine to-be-processed areas in accordance with an embodiment at a step in the processing represented by the flowchart shown in FIG. 7.
Figure 14:
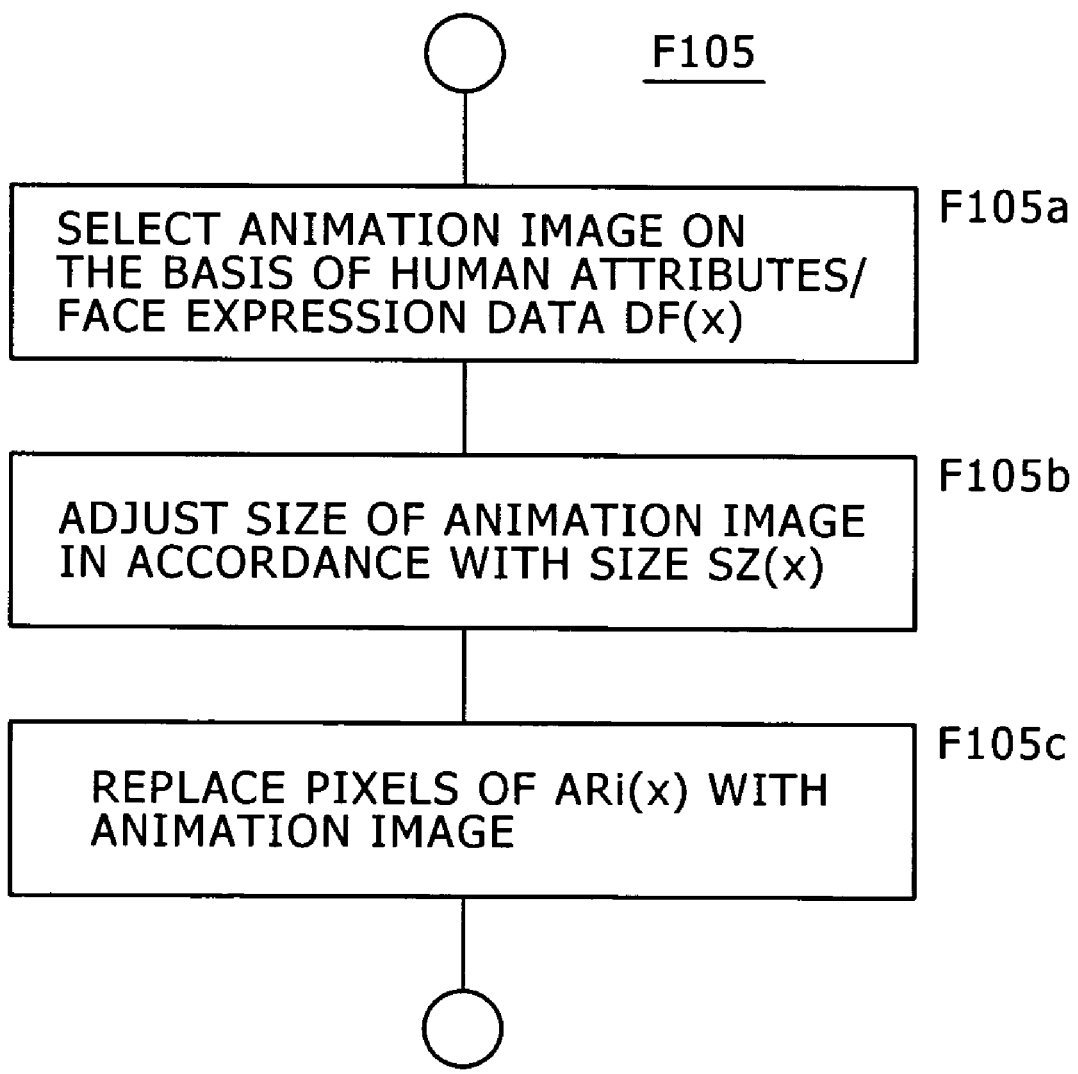
FIG. 14 shows a flowchart representing image conversion processing carried out in accordance with an embodiment at a step in the processing represented by the flowchart shown in FIG. 7.

FIGS. 13 and 14 show flowcharts representing typical processing carried out by the image analysis/conversion section 12 as described above. To be more specific, FIG. 13 shows a flowchart representing details of the process carried out by the image analysis/conversion section 12 at the step F102 included in the flowchart shown in FIG. 7. That is to say, the processing represented by the flowchart shown in FIG. 13 can be used as a substitute for the processing represented by the flowchart shown in FIG. 8, 9 or 10. On the other hand, FIG. 14 shows a flowchart representing details of the process carried out by the image analysis/conversion section 12 at the step F105 included in the flowchart shown in FIG. 7.

The flowchart shown in FIG. 13 is a flowchart obtained by adding steps F261 to F263 to the flowchart shown in FIG. 10. Steps F250, F251, F200 to F204, F252 to F254, F206, F207, F208 to F210 and F255 are identical with respectively their counterpart steps included in the flowchart shown in FIG. 10. Thus, detailed descriptions of these steps are not repeated.

In the case of the processing represented by the flowchart shown in FIG. 13, after a to-be-processed area ARi (X) is determined in the process carried out at the step F207, the processes of the steps F261 to F263 are performed.

At the step F261, the image analysis/conversion section 12 analyzes a face image with the pixel area thereof used as a to-be-processed area ARi (X) in order to recognize attributes and facial expression of a person, the face of which is shown in the face image. That is to say, the image analysis/conversion section 12 obtains information on the gender, age and facial expression of the person.

Then, at the next step F262, the image analysis/conversion section 12 stores the information on the gender, age and facial expression of the person in the memory 12a as attributes/facial expression data DF (X).

Subsequently, at the next step F263, the image analysis/conversion section 12 stores the size SZ of the facial face FC (Y) with the pixel area thereof used as the to-be-processed area ARi (X) in the memory 12a as a size SZ (X). As described earlier, the size SZ of the facial face FC (Y) is the size computed in the process carried out at the step F204.

After carrying out the processes of the steps F261 to F263, the flow of the processing represented by this flowchart goes on to a step F208.

In the processing represented by the flowchart shown in FIG. 13, the image analysis/conversion section 12 analyzes each facial face FC with the pixel area thereof used as a to-be-processed area ARi and stores temporary the attributes/facial expression data DF (X) as well as size SZ (X) of the facial face FC in the memory 12a.

If only one to-be-processed area ARi (1) has been determined in the process carried out at the step F207 for example, the image analysis/conversion section 12 stores the attributes/facial expression data DF (1) as well as the size SZ (1) for the to-be-processed area AR (1). If three to-be-processed areas ARi (1), ARi (2) and ARi (3) have been determined in the process carried out repeatedly at the step F207, on the other hand, the image analysis/conversion section 12 stores the attributes/facial expression data DF (1), DF (2) and DF (3) as well as the size SZ (1), SZ (2) and SZ (3) for the to-be-processed areas ARi (1), ARi (2) and ARi (3) respectively.

After the image analysis/conversion section 12 carries out the processing represented by the flowchart shown in FIG. 13 at the step F102 included in the flowchart shown in FIG. 7, the flow of the processing represented by the flowchart shown in FIG. 7 goes on to a step F103. Later on, at the step F105 included in the flowchart shown in FIG. 7, the image analysis/conversion section 12 carries out the processing represented by the flowchart shown in FIG. 14 as an image conversion process of the to-be-processed ARi (X).

The flowchart shown in FIG. 14 begins with a step F105a at which the image analysis/conversion section 12 retrieves the attributes/facial expression data DF (X) from the memory 12a and selects an animation image on the basis of the data DF (X). Normally, a number of animation images like the ones shown on the right side of FIGS. 11 and 12 have been stored in the memory 12a by associating the animation images with genders, age brackets and facial expressions. Thus, if the attributes/facial expression data DF (X) is data indicating a laughing face of a female adult as described earlier for example, an animation image associated with the female gender, the age bracket of the female adult as well as the laughing facial expression is selected and read out from the memory 12a.

Then, at the next step F105b, the image analysis/conversion section 12 adjusts the size aSZ of the animation image read out from the memory 12a to the size SZ (X) of the face image FC the pixel area thereof used as the to-be-processed area ARi (X). That is to say, the image analysis/conversion section 12 multiplies the size aSZ by a ratio {SZ (X)/aSZ} in an image contraction or enlargement process to make the size aSZ of the animation image read out from the memory 12a equal to the size SZ (X) of the face image FC the pixel area thereof used as the to-be-processed area ARi (X).

Finally, at the last step F105c, the image analysis/conversion section 12 replaces the pixel data of the to-be-processed area ARi (X) with the pixel data of the animation image having the adjusted size.

Thus, by carrying out the processes of the steps F105a, F105b and F105c as the process of the step F105 included in the flowchart shown in FIG. 7, the face image FC the pixel area thereof used as the to-be-processed area ARi (X) is replaced with an animation image selected in accordance with the gender, age bracket and facial expression of a person having its face represented by the face image FC in order to generate a post-conversion image.

6: Processing Objects Other than Face Images

In the above descriptions, a face image existing in a taken image obtained as a result of a photographing is extracted from the taken image as a photographed-subject image of a specific type. Then, if the size of the face image which is obtained as a result of a manual photographing is determined to be a small size, the pixel area of the face image is used as a to-be-processed area ARi. As an alternative, if the size of the face image which is obtained as a result of an automatic photographing is determined to be a large size, the pixel area of the face image is used as a to-be-processed area ARi.

However, the specific-type photographed-subject image extracted from a taken image to be used as a photographed-subject image for determining a to-be-processed area ARi is by no means limited to face images. That is to say, there are a variety of conceivable specific-type photographed-subject images other than face images.

The conceivable photographed-subject images of specific types include a painting, an industrial art object, a wall painting, the jacket of a package recording medium such as a CD or a DVD, the front cover of a book and the contents of a book, regarded as a copyrighted work. In addition, a brand name, a logo, a trademark or the like can also be handled as a photographed-subject image of a specific type. On top of that, the number plate of a car, a currency bill or the like can also be regarded as a photographed-subject image of a specific type as well.

In the following description, the photographed-subject images of specific types are referred to as a generic term 'copyrighted works'.

If the copyrighted works described above are each treated as a photographed-subject image of a specific type, in the analysis of a taken image, it is necessary to recognize any specific-type photographed-subject images each included in the taken image as a copyrighted work. To put it concretely, the process is carried out at the step F200 of the flowcharts shown in FIGS. 8, 9 and 10 in order to detect and extract not only face images FC from the taken image, but also any specific-type photographed-subject images each included in the taken image as a copyrighted work. Then, in the same way as the face image FC, a photographed-subject image extracted from the taken image as an image of a specific type is determined to be an image with the pixel area thereof to be used as a to-be-processed area ARi on the basis of the size of the specific-type photographed-subject image regarded as a copyrighted work.

After a photographed-subject image extracted from the taken image as an image of a specific type is determined to be an image with the pixel area thereof to be used as a to-be-processed area ARi on the basis of the size of the specific-type photographed-subject image regarded as a copyrighted work, the process of the step F105 included in the flowchart shown in FIG. 7 is carried out. In the process carried out at the step F105, the specific type photographed-subject image regarded as a copyrighted work is subjected to a mosaic generating process, a soft focusing process or an image encryption process (also referred to as an image scrambling process). As an alternative, the specific-type photographed-subject image regarded as a copyrighted work is replaced with another image such as an animation image.

That is to say, if the image analysis/conversion section 12 is capable of detecting and extracting any specific-type photographed-subject images each included in a taken image as a copyrighted work from the taken image, the image analysis/conversion section 12 will be capable of carrying out an image conversion process on the specific-type photographed-subject images each detected and extracted from the taken image in the same way as the face image FC.

In an analysis of a taken image obtained as a result of a photographing in order to determine the existence of a copyrighted work in the taken image, it is conceivable to make use of the copyrighted-work database 16.

The copyrighted-work database 16 is used for storing images of copyrighted works in advance. As described above, the copyrighted works stored in the copyrighted-work database 16 in advance include a painting, an industrial art object, a wall painting, the jacket of a package recording medium such as a CD or a DVD, the front cover of a book, a brand name, a logo, a trademark and a currency bill.

For example, in the case of a photographed-subject image enclosed by a contour line forming a quadrangle such as a rectangle (or a square), an oblong, a trapezium or a parallelogram, the photographed-subject image is merely extracted from the original taken image obtained as a result of a photographing. Examples of a quadrangular photographed-subject image are a painting and the jacket of a CD. It is to be noted that, in general, a photographed-subject image enclosed by a contour line, which forms a quadrangle such as a rectangle (or a square) or an oblong as is the case of a painting or the jacket of a CD, actually appears in the original taken image as a trapezium or a parallelogram due to photographing parameters such as the image taking direction, the elevation angle of the photographing and the closeness to the object of photographing. In this case, an effective analysis can be carried out as follows. First of all, such a trapezium or such a parallelogram is just extracted from the original taken image and, from factors including the state of the entire contour line formed on the original taken image as the contour line of a road, a building or the like, the photographing parameters such as the image taking direction and the elevation angle of the photographing can be estimated. Then, the estimated photographing parameters are used to estimate the original quadrangular shape of the real photographed subject.

After a photographed-subject image having a quadrangular shape is extracted from the original taken image, the pattern of the photographed-subject image having a quadrangular shape is collated with images stored in advance in the copyrighted-work database 16. If the pattern of the photographed-subject image having a quadrangular shape matches or is similar to an image stored in advance in the copyrighted-work database 16, the photographed-subject image having a quadrangular shape is regarded as a copyrighted work.

In addition, also in the case of a specific-type photographed subject such as a logo, a brand name, a trademark or a currency bill, the pattern of the photographed-subject image of a specific type is collated with those stored in advance in the copyrighted-work database 16 in the same way as a photographed-subject image having a quadrangular shape in order to estimate the original quadrangular shape. In the case of a specific-type photographed subject such as a brand name or a trademark, characters in the photographed subject of a specific type can also be recognized and collated with those stored in advance in the copyrighted-work database 16.

The number plate of a car can be determined to be a copyrighted work by assuring that characters and numbers are laid out at positions determined in advance in the quadrangular shape of the plate, that is, by assuring that characters and numbers form a layout peculiar to a plate number.

7: Typical Operation Procedures

As described above, the image analysis/conversion section 12 determines to-be-processed areas ARi and generates a post-conversion image. It is conceivable that there are a large number of operation procedures which can be executed by the image pickup apparatus 1 according to the embodiment in order to perform the processing of the image analysis/conversion section 12. By referring to FIGS. 15 and 16, the following description explains typical operation procedures which can be executed by the image pickup apparatus 1 in accordance with control executed by the system controller 10. Each step of processing according to any of the operation procedures is carried out by predetermined members of the image pickup apparatus 1.

Figure 15A:
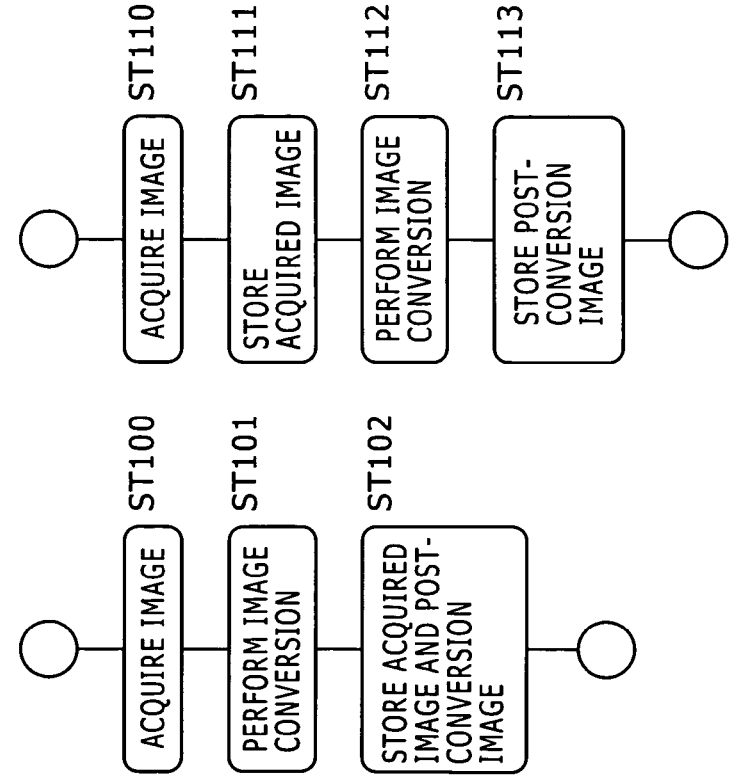
FIG. 15A shows a flowchart representing an operation procedure carried out by the image pickup apparatus according to an embodiment.

First of all, an operation procedure shown in FIG. 15A is executed as follows. As shown in the figure, the operation procedure begins with a step ST100 at which a taken image is acquired. It is to be noted that a taken image acquired in the operation procedures shown in FIGS. 15A, 15B, 15C and 15D as well as FIGS. 16A, 16B, 16C and 16D is an image obtained by the imaging section 3 as a result of a photographing, an image received by the communication section 15 from an external apparatus 70 or an image read out by the storage section 14 from an image recording medium.

Then, at the next step ST101, the taken image acquired in the process carried out at the step ST100 is supplied to the image analysis/conversion section 12, which subsequently carries out an image conversion process on the image. The image conversion process carried out by the image analysis/conversion section 12 on the taken image is the processing described earlier by referring to the flowchart shown in FIG. 7.

Then, at the next step ST102, the taken image acquired in the process carried out at the step ST100 and a post-conversion image obtained as a result of the image conversion process carried out by the image analysis/conversion section 12 at the step ST101 are stored in the storage section 14. That is to say, the taken image and the post conversion image are stored in entry #n of the data structure shown in FIG. 3.

Figure 15B:
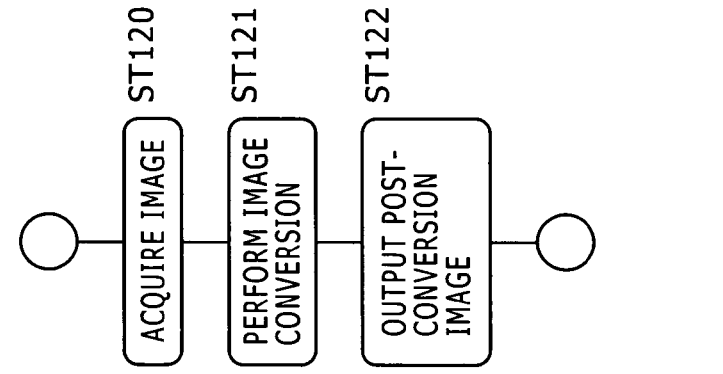
FIG. 15B shows a flowchart representing another operation procedure carried out by the image pickup apparatus according to an embodiment.

An operation procedure shown in FIG. 15B is executed as follows. As shown in the figure, the operation procedure begins with a step ST110 at which a taken image is acquired. Then, at the next step ST111, the taken image acquired in the process carried out at the step ST110 is stored in the storage section 14. Subsequently, at the next step ST112, the taken image acquired in the process carried out at the step ST110 is supplied to the image analysis/conversion section 12, which subsequently carries out an image conversion process on the image. Then, at the next step ST113, a post-conversion image obtained as a result of the image conversion process carried out by the image analysis/conversion section 12 at the step ST112 is stored in the storage section 14. Thus, at this point of time, the taken image and the post conversion image are stored in entry #n of the data structure shown in FIG. 3.

The operation procedures shown in FIGS. 15A and 15B are each a typical procedure in which the image analysis/conversion section 12 generates a post-conversion image from a taken image and saves the taken image and the post-conversion image in the storage section 14.

The taken and/or post-conversion images saved in the storage section 14 can be retrieved at a later point of time from the storage section 14 and displayed on the display section 2, transmitted to an external apparatus 70 through the communication section 15 or recorded back onto a portable recording medium mounted on the storage section 14.

Typically, the taken image is conceivably read out from the storage section 14 and displayed on the display section 2. On the other hand, the post-conversion image is conceivably read out from the storage section 14 and transmitted to the external apparatus 70 serving typically as a server employed in an image sharing system as the external apparatus 70.

Figure 15C:
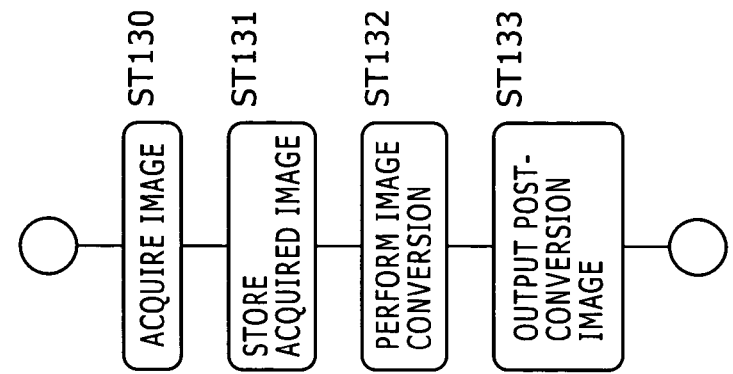
FIG. 15C shows a flowchart representing a further operation procedure carried out by the image pickup apparatus according to an embodiment.

An operation procedure shown in FIG. 15C is executed as follows. As shown in the figure, the operation procedure begins with a step ST120 at which a taken image is acquired. Then, at the next step ST121, the taken image acquired in the process carried out at the step ST120 is supplied to the image analysis/conversion section 12, which subsequently carries out an image conversion process on the image. Then, at the next step ST122, a post-conversion image obtained as a result of the image conversion process carried out by the image analysis/conversion section 12 at the step ST121 are output.

Figure 15D:
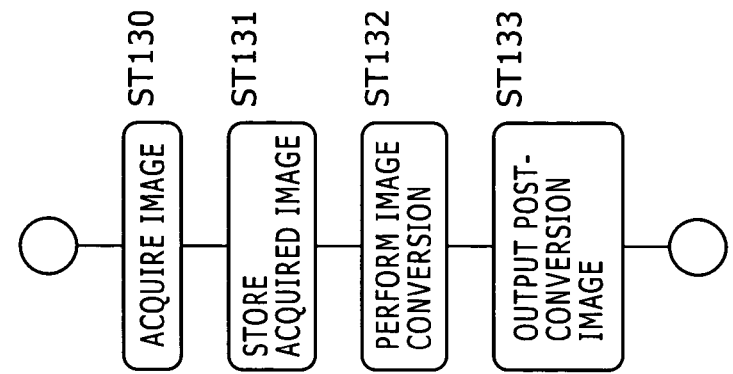
FIG. 15D shows a flowchart representing a still further operation procedure carried out by the image pickup apparatus according to an embodiment.

It is to be noted that in the operation procedures shown in FIGS. 15C and 15D as well as FIGS. 16A, 16B and 16D, a process to output a post-conversion image is a process to display the image on the display section 2 by way of the display control section 7, a process to transmit the image to the external apparatus 70 by way of the communication section 15 or a process to record the image onto a portable recording medium through the storage section 14 which is assumed to have a recording/reproduction unit for recording data onto the recording medium.

An operation procedure shown in FIG. 15D is executed as follows. As shown in the figure, the operation procedure begins with a step ST130 at which a taken image is acquired. Then, at the next step ST131, the taken image acquired in the process carried out at the step ST130 is stored in the storage section 14. Subsequently, at the next step ST132, the taken image acquired in the process carried out at the step ST130 is supplied to the image analysis/conversion section 12, which subsequently carries out an image conversion process on the image. Then, at the next step ST133, a post-conversion image obtained as a result of the image conversion process carried out by the image analysis/conversion section 12 at the step ST132 is output.

In the operation procedures explained above by referring to FIGS. 15C and 15D, neither the taken image nor the post-conversion image is saved into an internal image recording medium such as an HDD or a solid-state memory in the storage section 14 employed in the image pickup apparatus 1, and only the post-conversion image is output.

An operation procedure shown in FIG. 16A is executed as follows. As shown in the figure, the operation procedure begins with a step ST140 at which a taken image is acquired. Then, at the next step ST141, the taken image acquired in the process carried out at the step ST140 is supplied to the image analysis/conversion section 12, which subsequently carries out an image conversion process on the image. Then, at the next step ST142, the taken image acquired in the process carried out at the step ST140 and a post-conversion image obtained as a result of the image conversion process carried out by the image analysis/conversion section 12 at the step ST141 are stored in the storage section 14. Subsequently, at the next step ST143, the post-conversion image obtained as a result of the image conversion process carried out by the image analysis/conversion section 12 at the step ST141 is output.

An operation procedure shown in FIG. 16B is executed as follows. As shown in the figure, the operation procedure begins with a step ST150 at which a taken image is acquired. Then, at the next step ST151, the taken image acquired in the process carried out at the step ST150 is stored in the storage section 14. Subsequently, at the next step ST152, the taken image acquired in the process carried out at the step ST150 is supplied to the image analysis/conversion section 12, which subsequently carries out an image conversion process on the image. Then, at the next step ST153, a post-conversion image obtained as a result of the image conversion process carried out by the image analysis/conversion section 12 at the step ST152 is stored in the storage section 14. Subsequently, at the next step ST154, the post-conversion image obtained as a result of the image conversion process carried out by the image analysis/conversion section 12 at the step ST152 is output.

In the operation procedures explained above by referring to FIGS. 16A and 16B, the obtained taken image and the generated post-conversion image are saved into an internal image recording medium such as an HDD or a solid-state memory in the storage section 14 employed in the image pickup apparatus 1, and only the post-conversion image is output.

An operation procedure shown in FIG. 16C is executed as follows. As shown in the figure, the operation procedure begins with a step ST160 at which a taken image is acquired. Then, at the next step ST161, the taken image acquired in the process carried out at the step ST160 is supplied to the image analysis/conversion section 12, which subsequently carries out an image conversion process on the image. Then, at the next step ST162, a post-conversion image obtained as a result of the image conversion process carried out by the image analysis/conversion section 12 at the step ST161 are saved in the storage section 14.

An operation procedure shown in FIG. 16D is executed as follows. As shown in the figure, the operation procedure begins with a step ST170 at which a taken image is acquired. Then, at the next step ST171, the taken image acquired in the process carried out at the step ST170 is supplied to the image analysis/conversion section 12, which subsequently carries out an image conversion process on the image. Subsequently, at the next step ST172, a post-conversion image obtained as a result of the image conversion process carried out by the image analysis/conversion section 12 at the step ST171 is stored in the storage section 14. Then, at the next step ST173, the post-conversion image obtained as a result of the image conversion process carried out by the image analysis/conversion section 12 at the step ST171 is output.

In the operation procedures explained above by referring to FIGS. 16C and 16D, the post-conversion image obtained as a result of the image conversion process carried out by the image analysis/conversion section 12 at the step ST161 or ST171 respectively is saved into an internal image recording medium such as an HDD or a semiconductor memory in the storage section 14 employed in the image pickup apparatus 1 but the taken image is not. In the case of the operation procedure explained above by referring to FIG. 16C, the post-conversion image saved in the storage section 14 can be output at a later point of time. In the case of the operation procedure explained above by referring to FIG. 16D, on the other hand, the post-conversion image obtained as a result of the image conversion process carried out by the image analysis/conversion section 12 at the step ST171 is saved and output at the same time. In the operation procedures explained above by referring to FIGS. 16C and 16D, the taken image acquired at the step ST160 or ST170 respectively is neither saved in the storage section 14 nor output.

However, the image conversion process can typically be a scramble process. In this case, the post-conversion image obtained as a result of the image conversion process can be descrambled in order to generate the original taken image, which can then be output. This scheme is proper for an apparatus having an encryption key to be used for descrambling the post-conversion image or for an apparatus allowing only a specific user to view the original taken image.

Typical operations carried out by the image pickup apparatus 1 have been described above. However, a variety of other operations that can be carried out by the image pickup apparatus 1 are conceivable.

8: Effects of the Embodiments, Typical Modifications and Typical Extensions

In accordance with the embodiments described above, a photographed-subject image included in a taken image as photographed-subject image of a specific type is subjected to a proper image conversion image depending on the size of the photographed-subject image. As described earlier, examples of the photographed-subject image are an image of the face of a person and an image of a copyrighted work. Typically, the image conversion process is carried out to convert the photographed-subject image into an image which cannot be recognized or an image difficult to recognize. As an alternative to the image conversion process, another process can be carried out in order to replace the photographed-subject image with another image. In this way, the photographed-subject image can be subjected to a proper process which the user is not aware of.

For example, an image taken by the user in a manual photographing includes an image of typically a desired person serving as the main object of photographing. In this case, however, an image of a photographed subject such as another person may be taken inadvertently in the background of the main object of photographing, possibly raising a problem. To be more specific, an image-right problem or the like may be raised, depending on the way the taken image is used. For example, an image-right problem may be raised if the taken image is disclosed to the public. In such a case, it is proper to carry out a mosaic generating process or the like on the specific-type photographed-subject image included in the background. As described earlier, examples of the photographed-subject image of a specific type are an image of the face of the other person or an image of a copyrighted work.

In addition, an image obtained as a result an automatic photographing in which the user is not aware of a shutter operation may include a large image not intended by the user. The large image not intended by the user is typically a large image of the face of a person or a copyrighted work. In this case, an image-right problem or a copyright problem may be raised, depending on the way the taken image is used. In order to solve the problem, it is proper to carry out a mosaic generating process or the like on the large image of the person or the copyrighted work. If the image of the face of the person is too small to be recognizable or the image of the copyrighted work so small that the contents of the work cannot be recognized, on the other hand, the taken image can be disclosed as it is without raising any problems.

If the image conversion process is carried to replace an image of the face of a person with an animation image, the animation image is selected in accordance with the gender, age bracket and facial expression of the person. In this way, a problem of an image right or the like can be avoided. In addition, the image of the face of a person can be replaced with an interesting animation image.

However, implementations of the present invention are by no means limited to the embodiments. That is to say, there are a variety of conceivable modified versions and conceivable extensions for the typical configuration of the image pickup apparatus 1 and the typical processing carried out by the image pickup apparatus 1. In other words, the image-processing apparatus provided by the present invention can be implemented as not only the image pickup apparatus 1 but also as any one of a variety of apparatus other than the image pickup apparatus 1.

Figure 17:
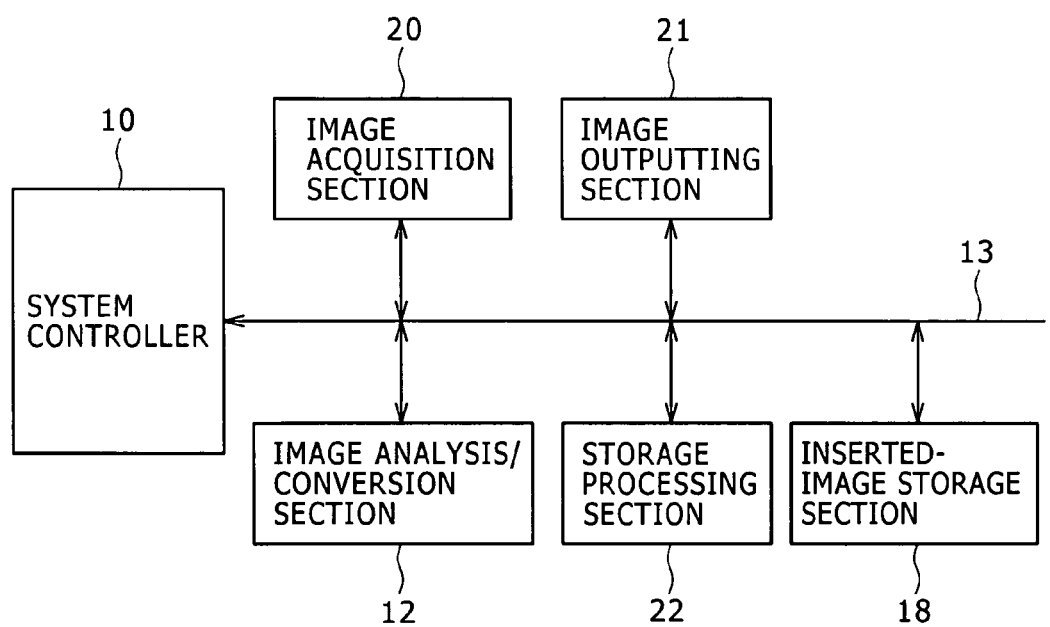
FIG. 17 is an explanatory diagram showing a configuration of elements composing the image-processing apparatus provided by the present invention as an image pickup apparatus.

FIG. 17 is a diagram showing an image-processing apparatus provided by the present invention as an apparatus with a configuration including a system controller 10, an image acquisition section 20, an image outputting section 21, an image analysis/conversion section 12, a storage processing section 22 and an inserted-image storage section 18. The image-processing apparatus provided by the present invention can be implemented by an apparatus having the configuration elements shown in FIG. 17. In particular, an apparatus employing at least the image acquisition section 20 and the image analysis/conversion section 12 can be used as the image-processing apparatus provided by the present invention. In addition, even if one of the image outputting section 21 and the storage processing section 22 or both the image outputting section 21 and storage processing section 22 are eliminated from the image-processing apparatus shown in FIG. 17, it can still be assumed that the image-processing apparatus is yet usable as an image-processing apparatus according to the present invention.

The image acquisition section 20 is a unit for acquiring a taken image to be processed by the image analysis/conversion section 12. The image acquisition section 20 has the functions of the imaging section 3 as well as the imaging control section 6, the communication section 15 and/or the storage section 14 which are employed in the image pickup apparatus 1 according to the embodiment described earlier by referring to FIG. 2. As explained before, the storage section 14 is a recording/reproduction drive for recording data such as a taken image onto a portable recording medium such as a memory card or an optical disk and reproducing data from the medium.

In addition, a taken image acquired by the image acquisition section 20 can be a standstill image or a moving image.

Much like the embodiments described earlier, the image analysis/conversion section 12 is a unit for carrying out a process to determine to-be-processed areas and an image inversion process. That is to say, the image analysis/conversion section 12 is to-be-processed area setting means and conversion means which are described in a claim of the present invention.

It is needless to say that the to-be-processed area setting means for carrying out an analysis on a taken image to determine the to-be-processed area and the conversion means for carrying out the image conversion processing on the image in the to-be-processed area can be typically implemented by a processing circuit unit as physically separated unit.

The storage processing section 22 is a member for carrying out a process to save the post-conversion image. That is to say, the storage processing section 22 is a unit corresponding to the storage section 14 employed in the embodiment described previously. In the case of a taken image to be transmitted to an external apparatus 70 and stored in an image storage section 71 employed in the external apparatus 70 in a scheme shown in FIG. 4B or 4C, however, the storage processing section 22 carries out the functions of the communication section 15 employed in the embodiment described previously as a unit for transmitting the taken image. It is needless to say that an image can be transmitted to the external apparatus 70 through a radio or wire communication.

The image outputting section 21 is a unit corresponding to the display section 2 employed in the embodiment described previously as a section for displaying a taken image. In addition, the image outputting section 21 also carries out functions of an image output unit for outputting a post-conversion image to an external monitor apparatus for displaying the image.

On top of that, the image outputting section 21 may also carry out the functions of the communication section 15 for carrying out radio or wire communications in order to transmit post-conversion images to the external apparatus 70 in accordance with the schemes shown in FIGS. 4B and 4C.

In addition, the image outputting section 21 also carries out the functions of a recording drive for recording a post-conversion image onto a portable recording medium used as a medium for transferring the image to an external apparatus.

As described above, it is possible to assume a very large number of implementations making use of the image acquisition section 20, the image outputting section 21 and the storage processing section 22. By taking the numerous implementations into consideration, the present invention can be applied to not only a photographing apparatus such as a still camera or a video camera, but also an apparatus having no imaging function. Examples of the apparatus having no imaging function are a monitor display apparatus, a communication apparatus, an image saving apparatus and an image editing apparatus for synthesizing images.

In addition, it should be understood by those skilled in the art that a variety of modifications, combinations, sub-combinations and alterations may occur, depending on design requirements and other factors insofar as they are within the scope of the appended claims or the equivalents thereof.

What is claimed is:

1. An image-processing apparatus comprising:
   taken-image acquisition means for acquiring a taken image;
   to-be-processed area setting means for carrying out an analysis on the taken image and for using a pixel area of a photographed-subject image of a specific type in said taken image as a to-be-processed area of an image conversion process in accordance with a size of said photographed-subject image if a result of said analysis indicates that said photographed-subject image exists in said taken image; and
   conversion means for carrying out said image conversion process on said photographed-subject image with said pixel area thereof used as said to-be-processed area in order to generate a post-conversion image obtained as a result of said image conversion process,
   wherein:
   said to-be-processed area setting means produces a first result of determination as to whether said taken image is taken in a manual photographing with a timing set by a manual operation or taken in an automatic photographing carried out automatically;
   if the first result of said determination indicates that said taken image is taken in the manual photographing with the timing set by the manual operation, said to-be-processed area setting means produces a second result of determination as to whether the size of the photographed-subject image of the specific type in said taken image is small or large and, if the second result of said determination indicates that said size of said photographed-subject image of the specific type is small, said to-be-processed area setting means uses the pixel area of said photographed-subject image of the specific type in said taken image as the to-be-processed area of the image conversion process; and if the first result of said determination indicates that said taken image is taken in the automatic photographing, said to-be-processed area setting means produces a third result of determination as to whether the size of the photographed-subject image of the specific type in said taken image is small or large and, if the third result of said determination indicates that said size of said photographed-subject image of the specific type is large, said to-be-processed area setting means uses the pixel area of said photographed-subject image of the specific type in said taken image as the to-be-processed area of the image conversion process.

2. The image-processing apparatus according to claim 1 wherein said photographed-subject image of the specific type in said taken image is of a face of a person.

3. The image-processing apparatus according to claim 1 wherein said photographed-subject image of the specific type in said taken image is of a copyrighted work.

4. The image-processing apparatus according to claim 1 wherein, as said image conversion process, said conversion means caries out processing to convert said photographed-subject image with the pixel area thereof used as said to-be-processed area into an image which cannot be recognized or is difficult to recognize.

5. The image-processing apparatus according to claim 1 wherein, as said image conversion process, said conversion means caries out processing to replace said photographed-subject image with the pixel area thereof used as said to-be-processed area with another image.

6. The image-processing apparatus according to claim 1 wherein, as said image conversion process, said conversion means caries out processing to replace a face image with the pixel area thereof used as said to-be-processed area with another image in accordance with a result of recognizing attributes of a person whose face is shown by said face image or a result of recognizing a facial expression of said face.

7. The image-processing apparatus according to claim 1 wherein said taken-image acquisition means includes an imaging unit for carrying out an image pickup process to acquire an image of an object of photographing.

8. The image-processing apparatus according to claim 7 wherein said imaging unit has a configuration including typically a CCD or CMOS sensor which serves as an imaging device.

9. The image-processing apparatus according to claim 1 wherein said taken-image acquisition means includes a communication unit for communicating with an external apparatus in order to acquire and receive the taken image from said external apparatus.

10. The image-processing apparatus according to claim 1 wherein said taken-image acquisition means includes a reproduction unit for reproducing information from a portable recording medium in order to acquire the taken image as a result of said reproduction of information from said portable recording medium.

11. The image-processing apparatus according to claim 1, further comprising
storage processing means for carrying out a storing process to store the post-conversion image generated as the result of the image conversion process carried out by said conversion means.

12. The image-processing apparatus according to claim 11 wherein:
said storage processing means includes a recording unit for recording information onto a recording medium; and
said recording unit carries out said storing process to store the post-conversion image generated as the result of the image conversion process carried out by said conversion means into said storage medium.

13. The image-processing apparatus according to claim 11 wherein:
said storage processing means also includes a communication unit for communicating with an external apparatus; and
in said storing process, said communication unit transmits the post-conversion image generated as the result of the image conversion process carried out by said conversion means to said external apparatus.

14. The image-processing apparatus according to claim 1, further comprising:
image output means for carrying out a process to output the post-conversion image generated as the result of the image conversion process carried out by said image conversion means.

15. The image-processing apparatus according to claim 14 wherein:
said image output means includes a display unit; and
in said process to output the post-conversion image generated as the result of the image conversion process carried out by said conversion means, said post-conversion image is output to said display unit for displaying said post-conversion image.

16. The image-processing apparatus according to claim 14 wherein:
said image output means includes a communication unit for communicating with an external apparatus; and
in said process to output the post-conversion image generated as the result of the image conversion process carried out by said conversion means, said communication unit transmits said post-conversion image to said external apparatus.

17. The image-processing apparatus according to claim 14 wherein:
said image output means includes a recording unit for recording information onto a portable recording medium; and
in said process to output the post-conversion image generated as the result of the image conversion process carried out by said conversion means, said recording unit stores said post-conversion image into said portable storage medium.

18. An image processing method comprising the steps of:
acquiring a taken image;
carrying out an analysis on the taken image and using a pixel area of a photographed-subject image of a specific type in said taken image as a to-be-processed area of an image conversion process in accordance with a size of said photographed-subject image if a result of said analysis indicates that said photographed-subject image exists in said taken image; and
carrying out said image conversion process on said photographed-subject image with said pixel area thereof used as said to-be-processed area in order to generate an image as a result of said image conversion process wherein:

carrying out the analysis comprises producing a first result of determination as to whether said taken image is taken in a manual photographing with a timing set by a manual operation or taken in an automatic photographing carried out automatically;

if the first result of said determination indicates that said taken image is taken in the manual photographing with the timing set by the manual operation, carrying out the analysis further comprises producing a second result of determination as to whether the size of the photographed-subject image of the specific type in said taken image is small or large and, if the second result of said determination indicates that said size of said photographed-subject image of the specific type is small, using the pixel area of the photographed-subject image comprises using the pixel area of said photographed-subject image of the specific type in said taken image as the to-be-processed area of the image conversion process; and if the first result of said determination indicates that said taken image is taken in the automatic photographing, carrying out the analysis further comprises producing a third result of determination as to whether the size of the photographed-subject image of the specific type in said taken image is small or large and, if the third result of said determination indicates that said size of said photographed-subject image of the specific type is large, using the pixel area of the photographed-subject image comprises using the pixel area of said photographed-subject image of the specific type in said taken image as the to-be-processed area of the image conversion process.

19. An image-processing apparatus comprising:

a taken-image acquisition section configured to acquire a taken image;

a to-be-processed area setting section configured to carry out an analysis on the taken image acquired by said taken-image acquisition section and configured to use a pixel area of a photographed-subject image of a specific type in said taken image as a to-be-processed area of an image conversion process in accordance with a size of said photographed-subject image if a result of said analysis indicates that said photographed-subject image exists in said taken image; and a conversion section configured to carry out said image conversion process on said photographed-subject image with said pixel area thereof used as said to-be-processed area in order to generate a post-conversion image obtained as a result of said image conversion process wherein:

said to-be-processed area setting section produces a first result of determination as to whether said taken image is taken in a manual photographing with a timing set by a manual operation or taken in an automatic photographing carried out automatically;

if the first result of said determination indicates that said taken image is taken in the manual photographing with the timing set by the manual operation, said to-be-processed area setting section produces a second result of determination as to whether the size of the photographed-subject image of the specific type in said taken image is small or large and, if the second result of said determination indicates that said size of said photographed-subject image of the specific type is small, said to-be-processed area setting section uses the pixel area of said photographed-subject image of the specific type in said taken image as the to-be-processed area of the image conversion process; and if the first result of said determination indicates that said taken image is taken in the automatic photographing, said to-be-processed area setting section produces a third result of determination as to whether the size of the photographed-subject image of the specific type in said taken image is small or large and, if the third result of said determination indicates that said size of said photographed-subject image of the specific type is large, said to-be-processed area setting section uses the pixel area of said photographed-subject image of the specific type in said taken image as the to-be-processed area of the image conversion process.

* * * * *